United States Patent
Chae et al.

(10) Patent No.: US 11,940,526 B2
(45) Date of Patent: Mar. 26, 2024

(54) METHOD AND APPARATUS FOR VEHICULAR MICROWAVE IMAGING BY MIRROR REFLECTION IN WIRELESS COMMUNICATION SYSTEM

(71) Applicant: LG ELECTRONICS INC., Seoul (KR)

(72) Inventors: Hyukjin Chae, Seoul (KR); Seung-Woo Ko, Hong Kong (CN); Kaibin Huang, Hong Kong (CN); Rui Wang, Hong Kong (CN); Zezhong Zhang, Hong Kong (CN)

(73) Assignee: LG ELECTRONICS INC., Seoul (KR)

( * ) Notice: Subject to any disclaimer, the term of this patent is extended or adjusted under 35 U.S.C. 154(b) by 374 days.

(21) Appl. No.: 17/265,192

(22) PCT Filed: Jul. 31, 2019

(86) PCT No.: PCT/KR2019/009571
§ 371 (c)(1),
(2) Date: Feb. 1, 2021

(87) PCT Pub. No.: WO2020/027591
PCT Pub. Date: Feb. 6, 2020

(65) Prior Publication Data
US 2021/0311181 A1 Oct. 7, 2021

(30) Foreign Application Priority Data
Jul. 31, 2018 (KR) .................. 10-2018-0089012

(51) Int. Cl.
*G01S 13/90* (2006.01)
*G01S 13/931* (2020.01)
*G01S 13/00* (2006.01)

(52) U.S. Cl.
CPC ...... *G01S 13/9027* (2019.05); *G01S 13/9017* (2013.01); *G01S 13/931* (2013.01); *G01S 2013/9316* (2020.01)

(58) Field of Classification Search
None
See application file for complete search history.

(56) References Cited

U.S. PATENT DOCUMENTS 5,693,885 A * 12/1997 Neidell ............. G01S 13/89
702/14
2005/0225481 A1 * 10/2005 Bonthron ........... G01S 13/931
342/175

(Continued)

FOREIGN PATENT DOCUMENTS

EP 3324201 A1 * 5/2018 .......... G01S 13/931
WO 2014032984 3/2014

OTHER PUBLICATIONS

J. Weiss, "Continuous-Wave Stepped-Frequency Radar for Target Ranging and Motion Detection"; Proceedings of Midwest Instruction and Computing Symposium (MICS) 2009; South Dakota School of Mines and Technology; Rapid City, South Dakota, USA. (Year: 2009).*

(Continued)

*Primary Examiner* — Bernarr E Gregory
(74) *Attorney, Agent, or Firm* — LEE, HONG, DEGERMAN, KANG & WAIMEY

(57) ABSTRACT

One embodiment of the present invention relates to a method for performing a vehicle image reconstruction by a sensing vehicle (SV) in a wireless communication system, the method comprising: receiving a plurality of stepped-frequency-continuous-wave (SFCW) from target vehicle (TV); receiving signature waveforms in a different frequency range for the plurality of SFCWs; performing synchronization by using phase-difference-of-arrival (PDoA)

(Continued)

based on the signature waveforms; reconstructing one or more virtual images of the TV; and deriving a real image from the one of more Virtual Image.

14 Claims, 17 Drawing Sheets

(56) References Cited

U.S. PATENT DOCUMENTS

| | | |
|---|---|---|
| 2013/0268173 A1 | 10/2013 | Kambe |
| 2014/0062762 A1 | 3/2014 | Kurono et al. |
| 2018/0196134 A1 | 7/2018 | Safavi-Naeini et al. |

OTHER PUBLICATIONS

D. Kadaba et al., "Real-time Through-wall Imaging Using SFCW Radar System"; Proceedings of the 9th International Radar Symposium India—2013 (IRSI-13); Bangalore, India. (Year: 2013).*
PCT International Application No. PCT/KR2019/009571, International Search Report dated Nov. 25, 2019, 10 pages.
Kaifeng Han, et al., "Sensing Hidden Vehicles by Exploiting Multi-Path V2V Transmission," 2018 IEEE 88th Vehicular Conference, Apr. 2018, 5 pages.

\* cited by examiner (a)

(b)

(a)

(b)

(a) Point model of TV, reflection surface and the receive aperture.

(b) Envelop Diagram of TV (a) Reconstructed TV image and the initial V model.

(b) Envelop Diagram of the reconstructed TV image.

METHOD AND APPARATUS FOR VEHICULAR MICROWAVE IMAGING BY MIRROR REFLECTION IN WIRELESS COMMUNICATION SYSTEM

CROSS-REFERENCE TO RELATED APPLICATIONS

This application is the National Stage filing under 35 U.S.C. 371 of International Application No. PCT/KR2019/009571, filed on Jul. 31, 2019, which claims the benefit of earlier filing date and right of priority to Korean Application No. 10-2018-0089012, filed on Jul. 31, 2018, the contents of which are all incorporated by reference herein in their entirety.

TECHNICAL FIELD

The following description relates to a wireless communication system, and more particularly to a method and apparatus for performing beam search or beam transmission based on location error information.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

Autonomous driving have grown into a reality with progress in object detection, recognition and mapping on the fusion of different sensing techniques. 2D or 3D imaging is an important part of autonomous driving since image information can help vehicles in object recognition and route planning [1]. In recent years, real-time detection systems based on light detection and ranging (LiDAR) and vision data are quite popular, where laser scanners and cameras are used for data collection. Ultrasonic sensors also play an important role in short range detection [2]. However, all the detection and recognition techniques above cannot function well in non-line-of-sight (NLoS) condition. To handle this problem, some techniques are proposed by establish vehicle-to-vehicle (V2V) communications, which enable vehicles to share the information through cooperation. But the V2V communication may not be stable under dynamic road conditions. In this specification, an imaging system using millimeter wave is proposed, which is able to capture the 3D images of vehicles around uvnder both LoS and NLoS conditions. Moreover, in foggy weathers, laser scanners and cameras may not perform well, where millimeter-wave (MMW) system is much more robust.

Multisensors are widely used in autonomous driving, where information gathers from different sensors helps guarantee the driving safety and plan the route wisely [3]. Alignment of information from different sensors improves the accuracy and reliability of sensing. Most widely used sensors include cameras, LiDARs, radar sensors, etc. Among all types of sensors, MMW systems is mostly considered as a type of radar sensors in autonomous driving to ensure the driving safety in foggy weather, which can offer high resolution and decent detection range simultaneously. For MMW imaging techniques, conventional synthetic aperture radar (SAR) [4] and inverse synthetic aperture radar ISAR [5] rely on the motion of the sensor or target, which have been maturely applied in aircraft or spacecraft. Over the last few years, highly integrated circuits with moderate costs are available in MMW frequencies. Therefore, the popularity of MMW antenna array based imaging techniques are increasing due to their high resolution and fast electronic scanning capability [6]. The array based imaging techniques can be divided into three categories: monostatic switched array, multiple-input multiple-output (MIMO) array, and phased array. However, all these MMW imaging techniques are based on the requirement of antenna scanning process, where antennas transmit signals sequentially because the round-trip distances cannot be determined if all transmit antennas and received antennas are switched on at the same time. The scanning process is quite time consuming, especially for the 3D imaging. Some compressive sensing techniques [6], [7] are proposed to reduce the scanning time, while it may cause some safety issues if applied to autonomous driving.

DISCLOSURE

Technical Problem

An object of the present disclosure is to provide a method for acquiring a shape of target vehicle.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present invention, provided herein is a method for performing a vehicle image reconstruction by a sensing vehicle (SV) in a wireless communication system, the method comprising: receiving a plurality of stepped-frequency-continuous-wave (SFCW) from target vehicle (TV); receiving signature waveforms in a different frequency range for the plurality of SFCWs; performing synchronization by using phase-difference-of-arrival (PDoA) based on the signature waveforms; reconstructing one or more virtual images of the TV; and deriving a real image from the one of more Virtual Imaging.

The signature waveforms corresponds to two pairs of signature waveforms, each pair contains two signature waveforms.

The each pair of signature waveforms are the transmitted from two specific transmit antenna at the TV.

The signature waveforms of each pair are received at different frequencies outside the bandwidth of the SFCW.

The synchronization is performed by deriving a synchronization gap between the TV and the SV.

The synchronization gap is derived based on phase difference between the two pairs of signature waveforms.

The one or more Virtual images are reconstructed by using 3D Fourier transform.

A deriving the real image is performed using that the real image is on a symmetric position of the virtual images on the basis of a reflection side of a mirror vehicle.

Two common point of virtual image 1 are $x_1^{(l)}=(x_1^{(l)}, y_1^{(l)}, z_1^{(l)})$ and $x_2^{(l)}=(x_2^{(l)}, y_2^{(l)}, z_2^{(l)})$.

The two common point corresponds to two specific transmit antenna of TV

The two common point of real image are $x_1=(x_1, y_1, z_1)$ and $x_2=(x_2, y_2, z_2)$.

A relation between the coordinates of $(x_1, x_2)$ is represented as $$x_i = \begin{pmatrix} x_i \\ y_i \\ z_i \end{pmatrix} = \begin{pmatrix} \frac{(z_i^{(\ell_1)} - z_i^{(\ell_2)}) + (x_i^{(\ell_2)}\tan(\theta^{(\ell_2)}) - x_i^{(\ell_1)}\tan(\theta^{(\ell_1)}))}{\theta^{(\ell_2)} - \theta^{(\ell_1)}} \\ y_i^{(\ell_1)} \text{ or } y_i^{(\ell_2)} \\ z_i^{(\ell_1)} + \tan\theta^{(\ell_1)}(x_i - x_i^{(\ell_1)}) \end{pmatrix},$$

$i = 1, 2,$ wherein $\theta^{(l)}$ denote the directed angle from the x-axis to the virtual line between $(x_1^{(l)}$ and $x_1)$ or $(x_2^{(l)}$ and $x_2)$.

The x-axis corresponds to the SV's moving direction.

In another aspect of the present invention, provided herein is a sensing vehicle (SV) performing a vehicle image reconstruction in a wireless communication system, the first terminal comprising: a transmitting device and a receiving device; and a processor, wherein the processor is configured to receive a plurality of stepped-frequency-continuous-wave (SFCW) from target vehicle (TV); to receive signature waveforms in a different frequency range for the plurality of SFCWs; to perform synchronization by using phase-difference-of-arrival (PDoA) based on the signature waveforms; to reconstruct one or more virtual images of the TV; and to derive a real image from the one of more Virtual Imaging.

Advantageous Effects

According to embodiments of the present invention, shape of target vehicle which is not visible from the sensing vehicle is acquired.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the disclosure. In the drawings.

BEST MODE

Figure 1:
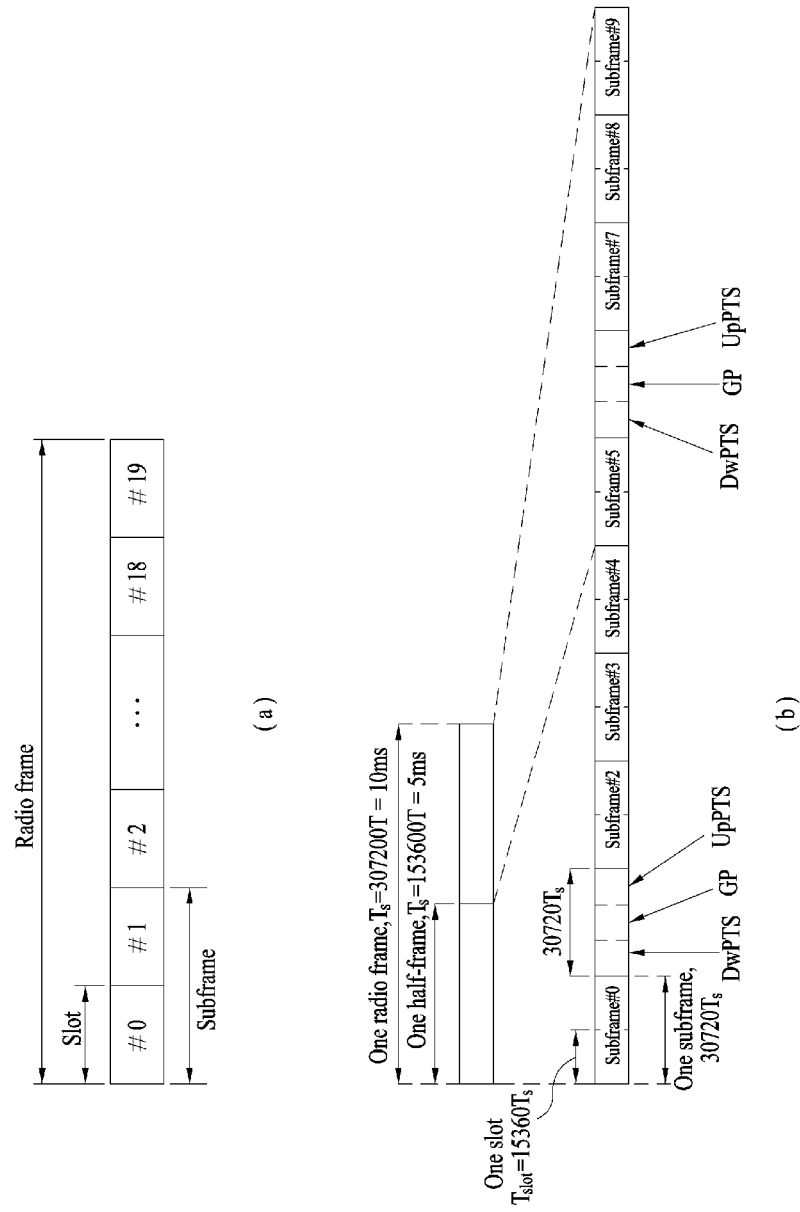
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP®), 3GPP® long term evolution (3GPP® LTE®), LTE-advanced (LTE-A), and 3GPP®2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM®)/general packet radio service (GPRS)/Enhanced Data Rates for GSM® Evolution (EDGE). OFDMA may be implemented as a radio technology such as IEEE 802.11 (Wi-Fi), IEEE 802.16 (WiMAX®), IEEE 802.20, evolved-UTRA (E-UTRA) etc. UTRA is a part of universal mobile telecommunications system (UMTS). 3GPP® LTE® is a part of Evolved UMTS (E-UMTS) using E-UTRA. 3GPP® LTE® employs OFDMA for downlink and SC-FDMA for uplink. LTE-A is an evolution of 3GPP® LTE®. WiMAX® can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP® LTE® and LTE-A systems. However, the technical features of the present disclosure are not limited thereto.

LTE /LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP® LTE® standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP® LTE® system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
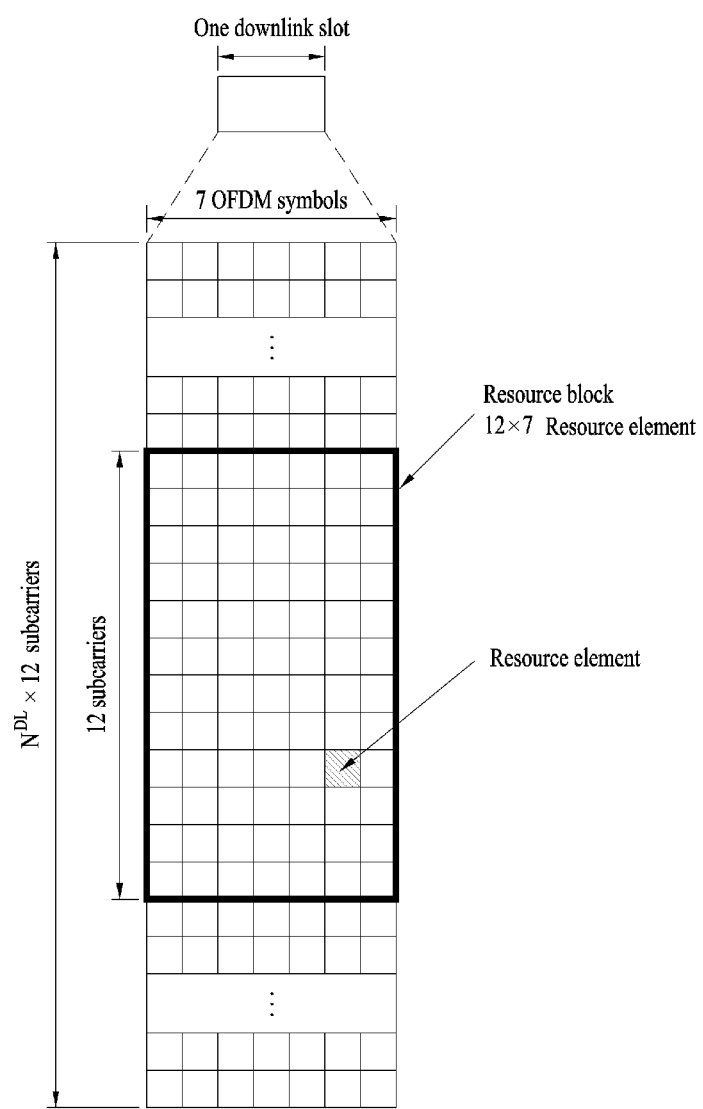
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
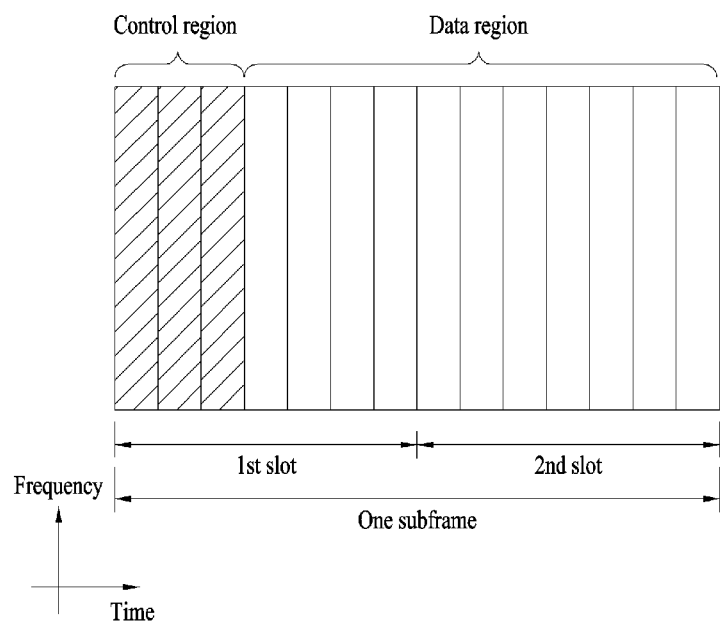
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP® LTE® system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
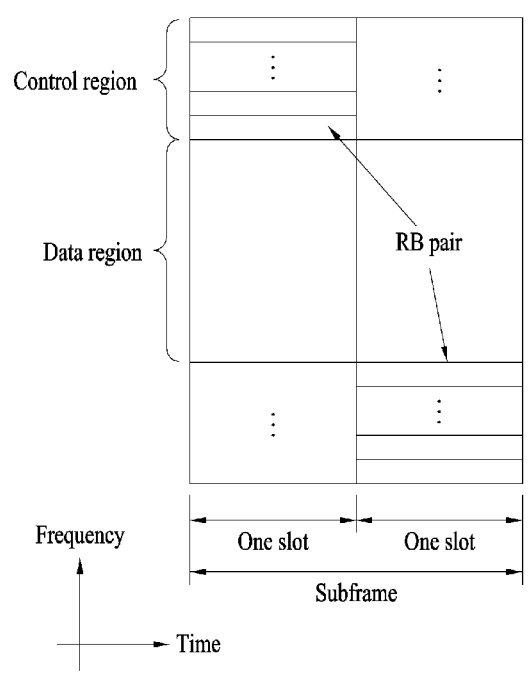
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE® system, the uplink RSs include:
  i) Demodulation-reference signal (DM-RS) used for channel estimation for coherent demodulation of information delivered on a PUSCH and a PUCCH; and
  ii) Sounding reference signal (SRS) used for an eNB or a network to measure the quality of an uplink channel in a different frequency.

The downlink RSs are categorized into:
  i) Cell-specific reference signal (CRS) shared among all UEs of a cell;
  ii) UE-specific RS dedicated to a specific UE;
  iii) DM-RS used for coherent demodulation of a PDSCH, when the PDSCH is transmitted;
  iv) Channel state information-reference signal (CSI-RS) carrying CSI, when downlink DM-RSs are transmitted;
  v) Multimedia broadcast single frequency network (MBSFN) RS used for coherent demodulation of a signal transmitted in MBSFN mode; and
  vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
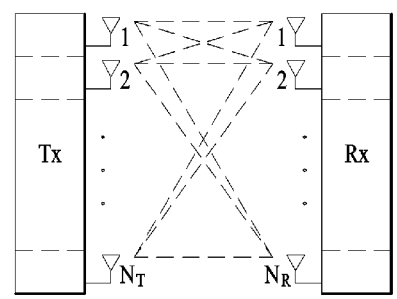
FIG. 5 is a view illustrating the configuration of a wireless communication system having multiple antennas.
Figure 5:
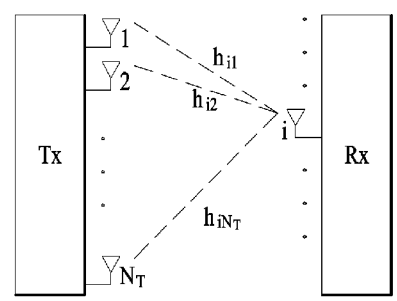

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

[Equation 1]

$$R_i = \min(N_T, N_R)$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

[Equation 2]

$$s = [s_1, s_2, \ldots, s_{N_T}]^T$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

[Equation 3]

$$\hat{s} = [\hat{s}_1, \hat{s}_2, \ldots, \hat{s}_{N_T}]^T = [P_1 s_1, P_2 s_2, \ldots, P_{N_T} s_{N_T}]^T$$

In addition, ŝ can be represented as Equation 4 using diagonal matrix P of the transmission power.

[Equation 4]

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps$$

Assuming a case of configuring $N_T$ transmitted signals $x_1, x_2, \ldots, x_{N_T}$, which are actually transmitted, by applying weight matrix W to the information vector ŝ having the adjusted transmit powers, the weight matrix W serves to appropriately distribute the transmission information to each antenna according to a transport channel state. $x_1, x_2, \ldots, x_{N_T}$ can be expressed by using the vector X as follows.

[Equation 5]

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

In Equation 5, $w_{ij}$ denotes a weight between an $i^{th}$ Tx antenna and $j^{th}$ information. W is also called a precoding matrix.

If the $N_R$ Rx antennas are present, respective received signals $t_1, y_2, \ldots, y_{N_R}$ of the antennas can be expressed as follows.

[Equation 6]

$$y = [y_1, y_2, \ldots, y_{N_R}]^T$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

[Equation 7]

$$h_i^T = [h_{i1}, h_{i2}, \ldots, h_{iN_T}]$$

Accordingly, all channels from the $N_T$ Tx antennas to the $N_R$ Rx antennas can be expressed as follows.

[Equation 8]

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

[Equation 9]

$$n = [n_1, n_2, \ldots, n_{N_R}]^T$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

[Equation 10]

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R/N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

[Equation 11]

$$\text{rank}(H) \leq \min(N_T, N_R)$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE®/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
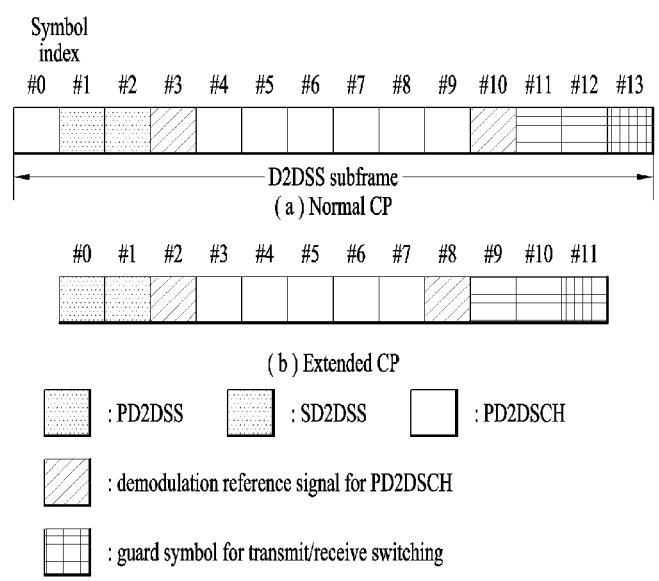
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
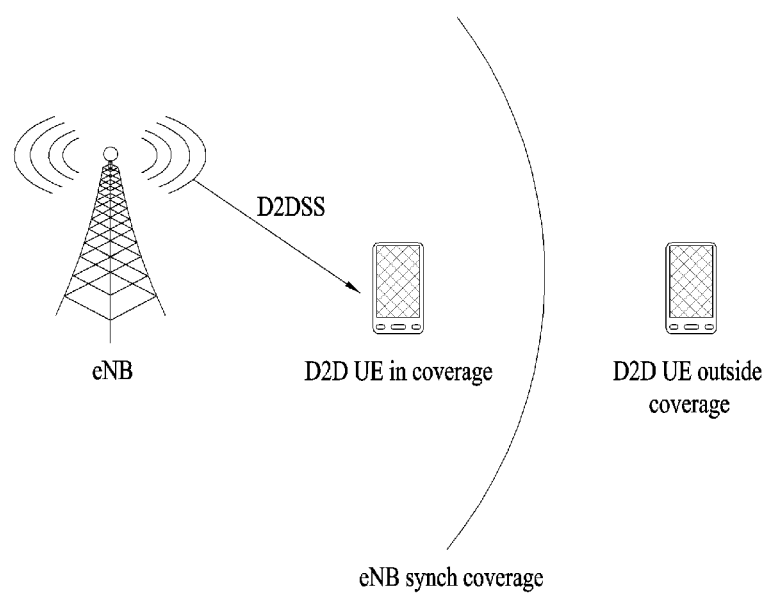
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
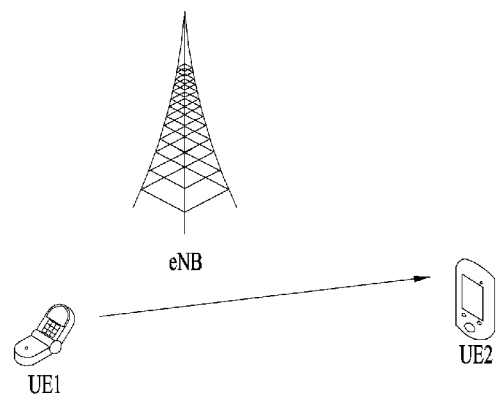
FIG. 8 is a view illustrating an exemplary D2D resource pool for D2D communication.
Figure 8:
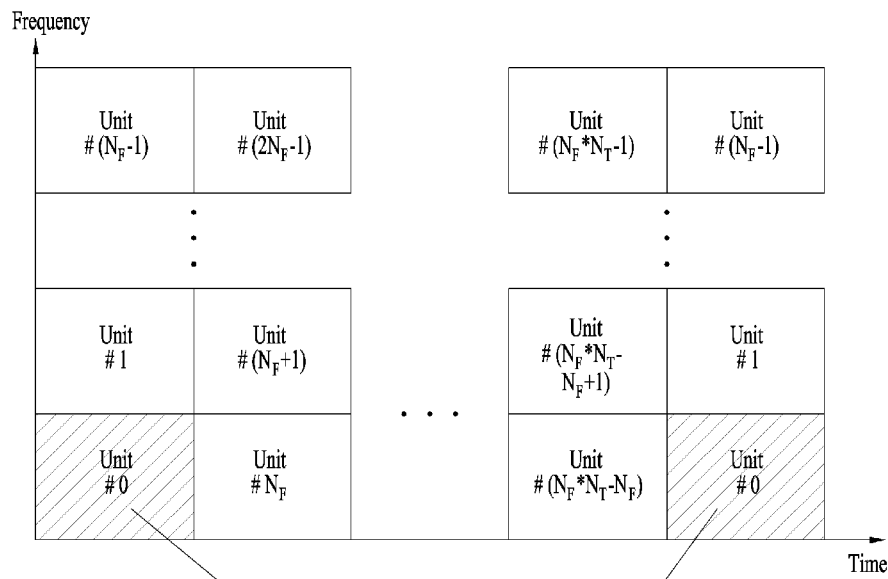

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
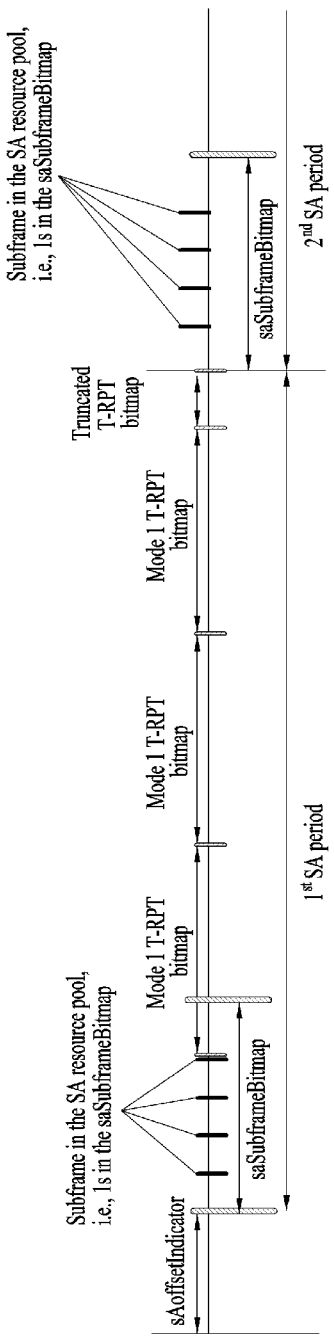
FIG. 9 is a view illustrating a scheduling assignment (SA) period.

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to is set in a T-RPT bitmap in an indicated T-RPT, and transmits one medium access control layer protocol data unit (MAC PDU) four times.

In vehicle-to-vehicle communication, a Cooperative Awareness Message (CAM) of a periodic message type, a Decentralized Environmental Notification Message (DENM) of an event triggered message type, and the like may be transmitted. The CAM may contain basic vehicle information such as dynamic state information about a vehicle including the direction and speed, static vehicle data such as dimensions, external lighting conditions, and route history. The size of the CAM message may be 50 to 300 bytes. The CAM message shall be broadcast and the latency shall be shorter than 100 ms. The DENM may be a message generated in an unexpected situation such as a vehicle malfunction or an accident. The size of the DENM may be less than 3000 bytes, and any vehicle within the transmission range may receive the message. In this case, the DENM may have a higher priority than the CAM. Having a high priority may mean that when transmissions are triggered simultaneously from the perspective of a UE, a transmission with a higher priority is preferentially performed, or mean that transmission of a message with a higher priority among multiple messages is preferentially attempted in terms of time. From the perspective of multiple UEs, a message with a higher priority may be set to be less subjected to interference than a message with a lower priority to lower the probability of reception errors. When security overhead is included, CAM may have a larger message size than when the security overhead is not included.

Similar to radar systems, conventional MMW imaging system using coherent signals for detection, where the transmitter and the receiver are connected [8]. However, the system may not be able to work in real time due to the long scanning process. In our scenario, the target vehicle (TV) transmits signals with antennas located around the vehicle body, while the sensing vehicle (SV) recovers the shape information from the received signals. In this scenario, the imaging algorithm allows the TV to transmit all signals together. Thus the scanning process is no more necessary. Moreover, conventional imaging techniques detect the shapes of objects based on the reflection process, while in our work, the shape information is contained in the location of transmit antennas. Thus the whole process is more efficient compared with traditional techniques. With the assistance of multiple mirror vehicles (MVs), we deal with a more general problem where the TV may be invisible to the sensing vehicle. Actually, the LoS case is an easier problem, where the receiver can distinguish the signals in LoS by their power levels and get the location information directly. On the other hand, a common-point detection approach to figure out the location information of the TV with signals reflected from multiple paths is proposed. It is also showed that the LoS case is an special case and can be solved in the same way in this specification.

Embodiments

Figure 10:
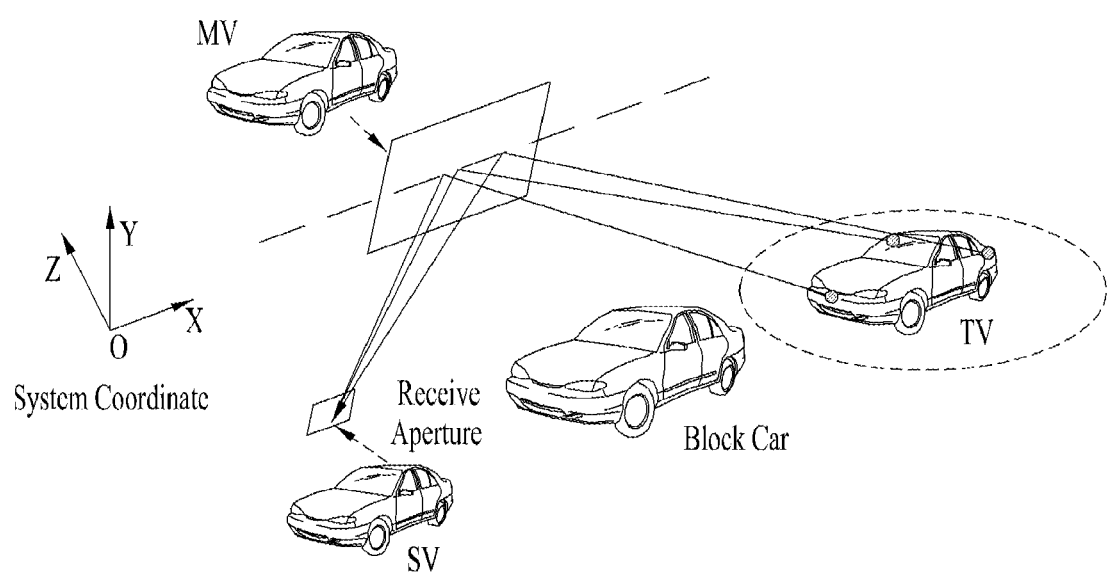
FIG. 10 illustrates a frame structure that is usable in new Radio Access Technology (RAT)
Figure 11:
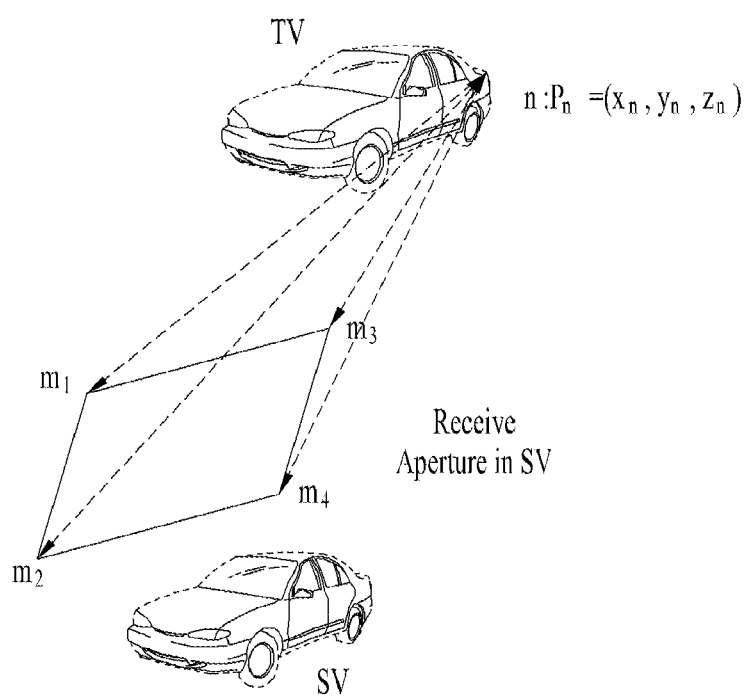
FIG. 11 illustrates the synchronization approach.

FIG. 10 depicts scenario for one embodiment, where multiple vehicles are located on the road. Every vehicle aims at obtaining nearby vehicles' 3D images to realize a wide range of applications, i.e., accident avoidance, autonomous driving, and navigation. To this end, each vehicle is equipped with an antenna array around the vehicle body, which can generally represent the shape of the vehicle. We adopt the wide-band imaging system using stepped-frequency-continuous-wave (SFCW) [9] at millimeter-wave range as the waveform for each transmit antenna, which has been widely used in radar systems to detect target at different distances. It is composed of continuous wave (CW) signals with multiple frequencies, each of which are separated by a certain amount. Once the phase information of the received signals is correctly detected, which is directly related to the travel time, it is possible for other vehicles to recover the image of this vehicle, which will be elaborated in the sequel. At millimeter-wave bands, due to the high attenuation loss and sparse distribution of scatters, most signal propagations follow LoS especially when vehicles are dispersive. However, a vehicle's metal body with a favorable reflection property makes it possible to propagate signals even in case of NLoS. FIG. 10 graphically illustrates the above NLoS case such that the SV is detecting a TV by receiving signals from TV, but the SV is blocked by other vehicles and cannot detect the TV directly. On the other hand, it is also possible that there are nearby vehicles enabling to reflect the signals from the TV, which is referred to as MVs. With the aid of multiple MVs, the SV is able to obtain the image of the TV, which is the main theme of this work. Without loss of generality, we let x direction be the moving direction of the SV, y direction be the height, z direction be the depth, and assume that the receive aperture is at the left side of the SV.

Based on the FIG. 10, the sensing vehicle receives a plurality of stepped-frequency-continuous-wave (SFCW) from target vehicle (TV) and signature waveforms in a different frequency range for the plurality of SFCWs. The signature waveforms corresponds to two pairs of signature waveforms, each pair contains two signature waveforms. The each pair of signature waveforms are the transmitted from two specific transmit antenna at the TV. The signature waveforms of each pair are received at different frequencies outside the bandwidth of the SFCW.

Based on the received signal, the SV performs synchronization by using phase-difference-of-arrival (PDoA), based on the signature waveforms. The synchronization is performed by deriving a synchronization gap between the TV and the SV. The synchronization gap is derived based on phase difference between the two pairs of signature waveforms. After synchronization, the SV reconstruct one or more virtual images of the TV and derive a real image from the one or more Virtual Imaging. The one or more Virtual images are reconstructed by using 3D Fourier transform. Deriving the real image is performed using that the real image is on a symmetric position of the virtual images on the basis of a reflection side of a mirror vehicle. Two common point of virtual image 1 are $x_1^{(l)}=(x_1^{(l)}, y_1^{(l)}, z_1^{(l)})$ and $x_2^{(l)}=(x_2^{(l)}, y_2^{(l)}, z_2^{(l)})$, the two common point corresponds to two specific transmit antenna of TV. And the two common point of real image are $x_1=(x_1, y_1, z_1)$ and $x_2=(x_2, y_2, z_2)$.

A relation between the coordinates of $(x_1, x_2)$ is represented as $$x_i = \begin{pmatrix} x_i \\ y_i \\ z_i \end{pmatrix} = \begin{pmatrix} \frac{(z_i^{(\ell_1)} - z_i^{(\ell_2)}) + (x_i^{(\ell_2)}\tan(\theta^{(\ell_2)}) - x_i^{(\ell_1)}\tan(\theta^{(\ell_1)}))}{\theta^{(\ell_2)} - \theta^{(\ell_1)}} \\ y_i^{(\ell_1)} \text{ or } y_i^{(\ell_2)} \\ z_i^{(\ell_1)} + \tan\theta^{(\ell_1)}(x_i - x_i^{(\ell_1)}) \end{pmatrix}, i = 1, 2.$$

wherein $\theta^{(l)}$ denote the directed angle from the x-axis to the virtual line between $(x_1^{(l)}$ and $x_1)$ or $(x_2^{(l)}$ and $x_2)$.

Hereinafter, the specific explanations are provided for the above embodiments.

Signal Model

As aforementioned, all transmit antennas at the TV simultaneously broadcast the same SFCW waveform denoted by s(t), which is given as

[equation 1]

$$s(t)=[\exp(j2\pi f_1(t)), \ldots, \exp(j2\pi f_K(t))]^T,$$

where $\{f_k\}_{k=1}^K$ represents the set of frequencies with constant gap $\Delta_f$ such that $f_k=f_1+\Delta_f(k-1)$ for k=1, ..., K. The received signals at the SV's receive antenna m is expressed as $$r_m(t) = \sum_{l=0}^{L} r_m^{(l)}(t), m = 1, \ldots, M, \quad \text{[equation 2]}$$

Where $r_m^{(l)}(t)$ represents the signal path reflected by the l-th MV as $$r_m^{(l)}(t) = \Gamma^{(l)} \sum_{n=1}^{N} r_{n,m}^{(l)}(t) = \Gamma^{(l)} \sum_{n=1}^{N} s(t + \sigma - \tau_{n,m}^{(l)}). \quad \text{[equation 3]}$$

Here, $\Gamma^{(l)}$ is the complex reflection coefficient given as $\gamma^{(l)}=|\Gamma^{(l)}|\exp(j<T^{(l)})$, $\sigma$ is the synchronization gap between the TV and the SV, and $\tau_{n,m}^{(l)}$ is the signal travel time from transmit antenna n to receive antenna m proportional to the travel distance $d_{n,m}$, i.e., $d_{n,m}=c\cdot\tau_{n,m}^{(l)}$ where $c=3\cdot 10^8$ (in meters/sec) is the speed of light. Note that signal path l=0 represents the LoS path of which the reflection coefficient $\Gamma^{(l)}$ is one without loss of generality. Last, we assume that the signals reflected by different MVs come from different directions, facilitating to differentiate signals from different MVs according to the angle-of-arrival (AoA). In other words, it is possible to rewrite equation 2 as a K by L+1 matrix $R_m(t)$ as follows:

[equation 4]

$$R_m(t) = [r_m^{(0)}(t), r_m^{(1)}(t), \ldots, r_m^{(L)}(t)].$$

The received signal of equation 4 can be demodulated by multiplying $D=\text{diag}\{s(t)^H\}$ as

[equation 5]

$$Y_m = [y_m^{(0)}, y_m^{(1)}, \ldots, y_m^{(L)}] = DR_m(t),$$

where $y_m^{(l)} = DR_m^{(l)}(t) = [y_m^{l,1}, y_m^{l,2}, \ldots, y_m^{l,N}]^T$ with the component $y_m^{l,k}$ being $$y_m^{\ell,k} = \Gamma^{(\ell)} \sum_{n=1}^{N} \exp(j2\pi f_k(\sigma - \tau_{n,m}^{(\ell)})). \qquad \text{[equation 6]}$$

Moreover, two representative antenna $n_1$ and $n_2$ are selected from the antenna array in the TV whose coordinates are denoted as $x_1^{(l)}=(x_1^{(l)}, y_1^{(l)}, z_1^{(l)})$ and $x_2^{(l)}=(x_2^{(l)}, y_2^{(l)}, z_2^{(l)})$, respectively. Using the selected antennas, TV simultaneously transmits signature waveforms with different frequencies $\{f_{K+1}, f_{K+2}\} \notin \{f_k\}_{k=1}^K$ at $n_i$ and $\{f_{K+3}, f_{K+4}\} \notin \{f_k\}_{k=1}^K$ at $n_2$ [11]. By using the similar demodulation step in equation 6, the SV can distinguish the waveforms as $$y_{n,m}^{\ell,k} = \Gamma^{(\ell)} \exp(j2\pi f_k(\sigma - \tau_{n,m}^{(\ell)})) \quad m=1,\ldots,M \quad k = \begin{cases} K+1, K+2, n=n_1 \\ K+3, K+4, n=n_2 \end{cases}. \qquad \text{[equation 7]}$$

Image Reconstruction of Target Vehicle

Assume that the TV and the SV are synchronized ($\sigma=0$). The above $y_m^{l,k}$ is then rewritten by the following surface integral form:

$$y_m^{\ell,k} \underset{(\sigma=0)}{\Longrightarrow} \Gamma^{(\ell)} \int I_x^{(\ell)} \exp\left(-j2\pi \frac{f_k}{c} D(x, p_m)\right) dx, \qquad \text{[equation 8]}$$

where $I_x$ is an indicator to become one if a transmit antenna exists on point x and zero otherwise. $D(x, p_m)$ represent the total propagation distance between p and the location of receive antenna m denoted by $p_m$. Recalling that the antennas are densely deployed on the surface of the TV, estimating $\{I_p\}$ is equivalent to reconstructing TVs image l, namely, $$\bigcup_{k=1}^{K} \{y_m^{\ell,k}\}_{m=1}^M \Rightarrow \{I_x^{(\ell)}\}. \qquad \text{[equation 9]}$$

It is worth noting that in case of LoS path (l=0), the distance $D(p, p_m)$ is given as the direct distance between P and Pm. Thus, the reconstructed image is on the location of real TV. In case of NLoS paths (l=1, ..., L), on the other hand, $D(p, p_m)$ is the total distance from P via MV l to $p_m$. Since SV has no prior information of MV's location, the reconstructed image could be located different from the real one, which is called a virtual image (VI) (see FIG. 10). It is necessary to map multiple VIs to the correct TV's location, namely, $$\bigcup_{\ell=0}^{L} \{I_x^{(\ell)}\} \Rightarrow \{I_x\}. \qquad \text{[equation 10]}$$

As a result, the proposed TV imaging technique follows three steps:
1) synchronization between the TV and the SV introduced in the sequel,
2) the reconstruction of image l by solving equation 9, and
3) mapping multiple VIs by solving equation 10.

Case 1: LOS Signal Path

In this section, we consider a case when LoS path between the TV and the SV exists, making it reasonable to ignore other NLoS paths due to the significant power difference between LoS and NLoS paths. Thus only 1) synchronization and 2) imaging reconstruction steps are needed.

Synchronization

We apply the techniques of phase-difference-of-arrival (PDoA) and localization to make the zero-synchronization gap ($\sigma=0$), which is illustrated in the following.

For synchronization in the LoS scheme, only the signals from the representative antenna $n_1$ is considered. Thus equation 7 can be rewritten as

[equation 11]

$$y_m^{(k)} = \exp(j2\pi f_k(\sigma - \tau_m)), \; m=1, \ldots, M \; k=K+1, K+2,$$

where the indices of path l and the transmit antenna $n_1$ are omitted for brevity.

At each receive antenna, the phase difference between two waveforms are $\eta_m = 2\pi\Delta(\tau_m - \sigma) + \varepsilon_m$, where $\Delta = f_{K+2} - f_{K+1}$ and $\varepsilon_m$ is the phase error at the receive antenna m. In other words, the travel distance, denoted by $d_m$, is given in terms of $\eta_m$ as $$d_m = c \cdot \tau_m = c \frac{\eta_m - \varepsilon_m}{2\pi\Delta} + c\sigma. \qquad \text{[equation 12]}$$

Noting that the location of SV's antenna m is known, $d_m$ is calculated when four unknown parameters are estimated: the location of the selected SV's antenna located on $x_n=(x_n, y_n, z_n)$ and the synchronization gap $\sigma$. In other words, we can derive $x_n$ and $\sigma$ together if there are at least four phase difference information.

Denote the location of the transmit antenna n as $x_n$, and the locations of the receive antennas as $\{p_m\}_{m=1}^M$. With the PDoA information, the SV can derive the location of the transmit antenna $x_n$ first by using a hyperbolic positioning approach [13]. Then the synchronization gap $\sigma$ can be obtained straightforward.

From equation 12, the travel distance difference between two receive antennas $m_i$ and $m_j$ can be expressed as

[equation 13]
$$d_{m_i} - d_{m_j} = c\frac{(\eta_{m_i} - \eta_{m_j} - \varepsilon_{m_i} + \varepsilon_{m_j})}{2\pi\Delta} = c\frac{(\eta_{m_i m_j} - \varepsilon_{m_i m_j})}{2\pi\Delta}, \quad (1)$$

which can be rewritten as

[equation 14]
$$\|p_{m_i} - x_n\| - \|p_{m_j} - x_n\| = c\frac{(\eta_{m_i m_j} - \varepsilon_{m_i m_j})}{2\pi\Delta}.$$

Define

[equation 15]
$$F_{m_i m_j}(x_n) = \|p_{m_i} - x_n\| - \|p_{m_j} - x_n\|,$$

where the partial derivation with respect to $x_n$ is

[equation 16]
$$\frac{\partial F_{m_i m_j}(x_n)}{\partial x_n} = -\frac{(p_{m_i} - x_n)^T}{\|p_{m_i} - x_n\|} + \frac{(p_{m_j} - x_n)^T}{\|p_{m_j} - x_n\|}.$$

If the initial value of $x_n$ as $x_{n,0} = (x_{n,0}, y_{n,0}, z_{n,0})$, by using the Newton-Raphson method, the first updated solution can be represented as

[equation 17]
$$F_{m_i m_j}(x_{n,1}) \approx \frac{\partial F_{m_i m_j}(x_{n,0})}{\partial x_{n,0}} \Delta x_{n,0} + F_{m_i m_j}(x_{n,0}),$$

where the second and higher order terms of the Taylor expansion of $F_{m_i m_j}(x_{n,0})$ is neglected. Therefore, equation 14 can be modified as

[equation 18]
$$c\frac{(\eta_{m_i m_j} - \varepsilon_{m_i m_j})}{2\pi\Delta} =$$
$$F_{m_i m_j}(x_{n,1}) \approx \frac{\partial F_{m_i m_j}(x_{n,0})}{\partial x_{n,0}} \Delta x_{n,0} + F_{m_i m_j}(x_{n,0}).$$

Similarly, with M selected antennas, $$\frac{m(m-1)}{2}$$

equations can be established, and thus we have

[equation 19]
$$\begin{bmatrix} \frac{\partial F_{21}(x_{n,0})}{\partial x} & \frac{\partial F_{21}(x_{n,0})}{\partial y} & \frac{\partial F_{21}(x_{n,0})}{\partial z} \\ \ldots & \ldots & \ldots \\ \frac{\partial F_{1M}(x_{n,0})}{\partial x} & \frac{\partial F_{1M}(x_{n,0})}{\partial y} & \frac{\partial F_{1M}(x_{n,0})}{\partial z} \end{bmatrix}$$
$$\begin{bmatrix} \Delta x \\ \Delta y \\ \Delta z \end{bmatrix} = \begin{bmatrix} c\frac{(\eta_{21} - \varepsilon_{21})}{2\pi\Delta} - F_{21}(x_{n,0}) \\ \ldots \\ c\frac{(\eta_{1M} - \varepsilon_{1M})}{2\pi\Delta} - F_{21}(x_{n,0}) \end{bmatrix}.$$

Rewrite the equation 19 in matrix from as

[equation 20]

$$G\Delta x_{n,0} = b.$$

By using the MMSE estimator, the estimated value of $\Delta x_{n,0}$ can thus be given as

[equation 21]

$$\Delta_{n,0} = (G^T G)^{-1} G^T b.$$

The estimated location of $x_n$ is then updated as

[equation 22]

$$x_{n,1} = x_{n,0} + \Delta \hat{x}_{n,0}.$$

By repeating the updating process several times, a sufficient approximate solution for the transmit antenna location $x_n$ is obtained.

Proposition 1 (Optimality of the Hyperbolic Positioning Approach). The hyperbolic positioning approach above gives an optimal solution, where the original optimization problem is given as

[equation 23]
$$\min \zeta\zeta^T$$
$$\text{s.t. } c\frac{(\eta_{m_i m_j} - \varepsilon_{m_i m_j})}{2\pi\Delta} - F_{m_i m_j}(x_n) = \zeta_{m_i m_j}, \forall m_i, m_j$$
$$z_n > 0,$$

where the constraints consist of $$\frac{M(M-1)}{2}$$

equations if M receive antennas are selected, and $\zeta = [\zeta_{12}, \zeta_{13}, \ldots, \zeta_{23}, \zeta_{24}, \ldots, \zeta_{(M-1)M}]$. Under the condition $\varepsilon_{m_i m_j} = 0$, $\forall m_i, m_j$, the optimization problem only achieve global optimality at $(x_n, y_n, z_n)$ $(x_n, y_n, -z_n)$ will naturally be another global optimal solution if the constraint $z_n$ is removed). By taking multiple points into consideration, the approach can achieve global optimal solution with high probability. Actually, any equation in the constraints forms a hyperbola by setting $\zeta_{m_i m_j} = 0$. Therefore, some intersection points can be found easily by selecting 3 equations appropriately from the constraints. The approach can work quite efficiently by taking an intersection point as the initial point.

Remark 1 (Sampling Requirement). The synchronization procedures above are based on the assumption that the phase gap estimated at each two adjacent receive antennas is no larger than $$\frac{\pi}{2}.$$

Thus the distance between each two adjacent receive antenna at the SV needs to satisfy $$\Delta d < \frac{c}{2\Delta}.$$

This requirement can be easily satisfied in practice.

The measurement of the phase difference $\eta_m = 2\pi\Delta(\tau_m - \sigma) + \varepsilon_m$ may be affected by phase ambiguity when it is larger than $2\pi$. At the SV equation 12 can be written as $$d_m = c\frac{\eta_m - \varepsilon_m}{2\pi\Delta} + c\sigma = c\frac{\hat{\eta}_m - \varepsilon_m}{2\pi\Delta} + c\hat{\sigma}, \quad \text{[equation 24]}$$

where $0 < \hat{\eta}_m < 2\pi$ is the phase detected at the receive antenna, and $\hat{\sigma}$ is the corresponding synchronization gap satisfying $$\hat{\sigma} = \sigma + \frac{q}{\Delta}, \quad q \in z.$$

However, when Remark 1 is satisfied, the phase difference gap $\eta_{m_i m_j}$ can still be correctly detected by

[equation 25]

$$\eta_{m_i m_j} = \eta_{m_i} - \eta_{m_j} = \hat{\eta}_{m_i} - \hat{\eta}_{m_j}.$$

Thus the hyperbolic positioning approach still works and $d_m$ can be obtained. According to equation 24, the SV can estimate the value of $\hat{\sigma}$ with $$\hat{\sigma} = \frac{1}{M}\sum_{m=1}^{M}\hat{\sigma}_m, \quad \hat{\sigma}_m = \frac{2\pi\Delta\hat{\sigma} - \varepsilon_m}{2\pi\Delta} = \frac{2\pi\Delta d_m - c\hat{\eta}_m}{2\pi c\Delta}, \quad \text{[equation 26]}$$

where the effect of noise is negligible when M is sufficiently large (e.g. M≥32). By compensating the synchronization gap in equation 6 with $\hat{\sigma}$, the signals $y_m^{l,k}$ at the SV can be expressed as $$y_m^{\ell,k} = \Gamma^{(\ell)}\sum_{n=1}^{N}\exp\left(j2\pi f_k(\sigma - \hat{\sigma} - \tau_{n,m}^{(\ell)})\right). \quad \text{[equation 27]}$$

It can be observed from equation 27 that

[equation 28]

$$y_m^{\ell,k} = \Gamma^{(\ell)}\sum_{n=1}^{N}\exp\left(j2\pi f_k(\sigma - \hat{\sigma} - \tau_{n,m}^{(\ell)})\right) = \Gamma^{(\ell)}\sum_{n=1}^{N}\exp\left(-j2\pi f_k \tau_{n,m}^{(\ell)}\right)$$

if and only if $f_k = p \cdot \Delta$, $p \in Z$ because the estimated synchronization gap ensures that $\Delta(\sigma - \hat{\sigma})$ is an integer.

Remark 2 (Phase Ambiguity Constraints). The imaging algorithm works only when equation 28 holds, where the phase of the received signals is only relevant to the travel distance or time. As illustrated above, it requires $f_k = p \cdot \Delta$, $p \in Z$, which means all frequencies used for the imaging procedure needs to be integer times of $\Delta$. Thus $\Delta$ is no larger than the frequency step of the signals for imaging $\Delta_f$.

Image Reconstruction

The synchronization gap $\sigma$ can be removed by the preceding step, facilitating to solve equation 9 in the following. Recall the synchronized demodulation equation 8 enabling to express $y_m^{(k)}$ as a 3D surface integral form as $$y_m^{(k)} = \int_{R^3} I_x \exp\left(-j\frac{2\pi f_k}{c}\sqrt{(x - p_m)(x - p_m)^T}\right)dx, \quad \text{[equation 29]}$$

where $\sqrt{(x - p_m)(x - p_m)^T}$ represents the Euclidean distance between point x and the location of the SV antenna m, denoted by $p_m = [x_m, y_m, z_0]$. Let $f_k = [f_k^{(x)}, f_k^{(y)}, f_k^{(z)}]$ denote the vector of which the components represent the spatial frequencies to the corresponding directions, namely,

[equation 30]

$$f_k = \sqrt{(f_k^{(x)})^2 + (f_k^{(y)})^2 + (f_k^{(z)})^2}.$$

As the spherical wave can be decomposed into an infinite superposition of plane waves [14], the exponential term in equation 27 can be rewritten in terms of $f_k$ such that $$y_m^{(k)} = \int_{R^3} I_x\left\{\int_{\sqrt{f_k f_k^T} = f_k}\exp\left(-j\frac{2\pi}{c}f_k(x - p_m)^T\right)df_k\right\}dx. \quad \text{[equation 31]}$$

Changing the order of the integrals in the above leads to $$y_m^{(k)} = \int_{\sqrt{f_k f_k^T} = f_k}\left\{\int_{R^3} I_x \exp\left(-j\frac{2\pi}{c}f_k(x - p_m)^T\right)dx\right\}df_k \quad \text{[equation 32]}$$

$$= \int_{\sqrt{f_k f_k^T} = f_k}\underbrace{\left\{\int_{R^3} I_x \exp\left(-j\frac{2\pi}{c}f_k x^T\right)dx\right\}}_{FT_{3D}(\{I_x\}, f_k)}\exp\left(j\frac{2\pi}{c}f_k(p_m)^T\right)df_k,$$

where $FT_{3D}(\cdot)$ represents 3D Fourier transform. Note that the term $$\exp\left(j\frac{2\pi}{c}f_k(p_m)^T\right)$$

can be decomposed into each spatial frequency as $$\exp\left(j\frac{2\pi}{c}f_k(p_m)^T\right) = \quad \text{[equation 33]}$$

$$\exp\left(j\frac{2\pi f_k^{(x)}}{c}x_m\right)\exp\left(j\frac{2\pi f_k^{(y)}}{c}y_m\right)\exp\left(j\frac{2\pi f_k^{(z)}}{c}z_0\right).$$

By plugging equation 33 into equation 32, we have $$y_m^{(k)} = \int\int \left\{ FT_{3D}(\{I_x\}, f_k) \exp\left(j\frac{2\pi f_k^{(z)}}{c} z_0\right) \right\} \exp\left(j\frac{2\pi}{c}(f_k^{(x)} x_m + f_k^{(y)} y_m)\right) df_k^{(x)} df_k^{(y)}$$

$$= FT_{2D}^{-1}\left\{ FT_{3D}(\{I_x\}, f_k) \exp\left(j\frac{2\pi f_k^{(z)}}{c} z_0\right), x_m, y_m \right\},$$

where $FT_{2D}^{-1}(\cdot)$ represent 2D inverse Fourier transform. As a result, the estimated indicators denoted by $\tilde{I}_x$ is estimated into the reverse direction as $$\tilde{I}_x = FT_{3D}^{-1}\left\{ FT_{2D}\left(\{y_m^{(k)}\}_{m=1}^M, f_k^{(x)}, f_k^{(y)}\right) \right.$$

$$\left. \exp\left(-j\frac{2\pi}{c}\frac{\sqrt{(f_k)^2 - (f_k^{(x)})^2 - (f_k^{(y)})^2}}{f_k^{(z)}} z_0\right), x \right\},$$ [equation 35]

where $FT_{3D}^{-1}$, $FT_{2D}$ represent 3-D inverse Fourier transform and 2-D Fourier transforms, respectively. Note that due to the finite deployment of antennas at the TV, the estimated $\tilde{I}_x$ could be a continuous value between [0,1]. It is thus necessary to map $\tilde{I}_x$ into either one or zero, namely, $$I_x = \begin{cases} 1, & \text{if } \tilde{I}_x \geq v, \\ 0, & \text{otherwise,} \end{cases} x \in R^3$$ [equation 36]

where $v$ represents the detection threshold affecting the performance of the image reconstruction described in the simulation part.

Remark 3 (Resampling in Frequency Domain). To calculate inverse 3D Fourier transform in equation 35, sampling on frequency domain with constant interval is necessary. However, due to the nonlinear relation of each frequency component as $\sqrt{f_k f_k^T} = f_k$, regular samplings on $f_k^{(x)}$ and $f_k^{(y)}$ lead to the irregular sampling sequence on $f_k^{(z)}$ domain. It is thus required to resample the irregular sampling sequence by using a interpolation to make them regular.

Remark 4 (Spatial and Range Resolution). Due to the relation of each component as $\sqrt{f_k f_k^T} = f_k$, the samplings $FT_{2D}(\{y_m^{(k)}\}_{m=1}^M, f_k^{(x)}, f_k^{(y)})$ obtained from the 2-D Fourier transform are constrained on $f_k^{(x)}$ and $f_k^{(y)}$, which needs to be set to zero if $(f_k^{(x)})^2 + (f_k^{(y)})^2 > (f_k)^2$. Thus the spatial resolution is affected by the selected frequency on $f_k^{(z)}$, which limits the bandwidth on $f_k^{(x)}$ and $f_k^{(y)}$. The spatial resolution [9] in x and y directions can be approximated as $$\delta_x = \delta_y \approx \frac{c}{\sqrt{(f_K)^2 - \left(\frac{f_1 + f_K}{2}\right)^2}}.$$ [equation 37]

Moreover, the range resolution in z direction is $$\delta_z \approx \frac{c}{(f_K - f_1)} = \frac{c}{B}.$$ [equation 38]

1). Let $\theta^{(l)}$ denote the directed angle from the x-axis (SV's moving direction) to the virtual line between $x_1^{(l)}$ and $x_1$ or $x_2^{(l)}$ and $x_2$ (see FIG. 12). The relation between the coordinates of $(x_1, x_2)$ are given in terms of $\theta^{(l_1)}$ and $\theta^{(l_2)}$ as $$x_i = \begin{pmatrix} x_i \\ y_i \\ z_i \end{pmatrix} = \begin{pmatrix} \frac{(z_i^{(l_1)} - z_i^{(l_2)}) + (x_i^{(l_2)} \tan(\theta^{(l_2)}) - x_i^{(l_1)} \tan(\theta^{(l_1)}))}{\theta^{(l_2)} - \theta^{(l_1)}} \\ y_i^{(l_1)} \text{ or } y_i^{(l_2)} \\ z_i^{(l_1)} + \tan\theta^{(l_1)}(x_i - x_i^{(l_1)}) \end{pmatrix},$$ [equation 42]

$i = 1, 2.$

Figure 12:
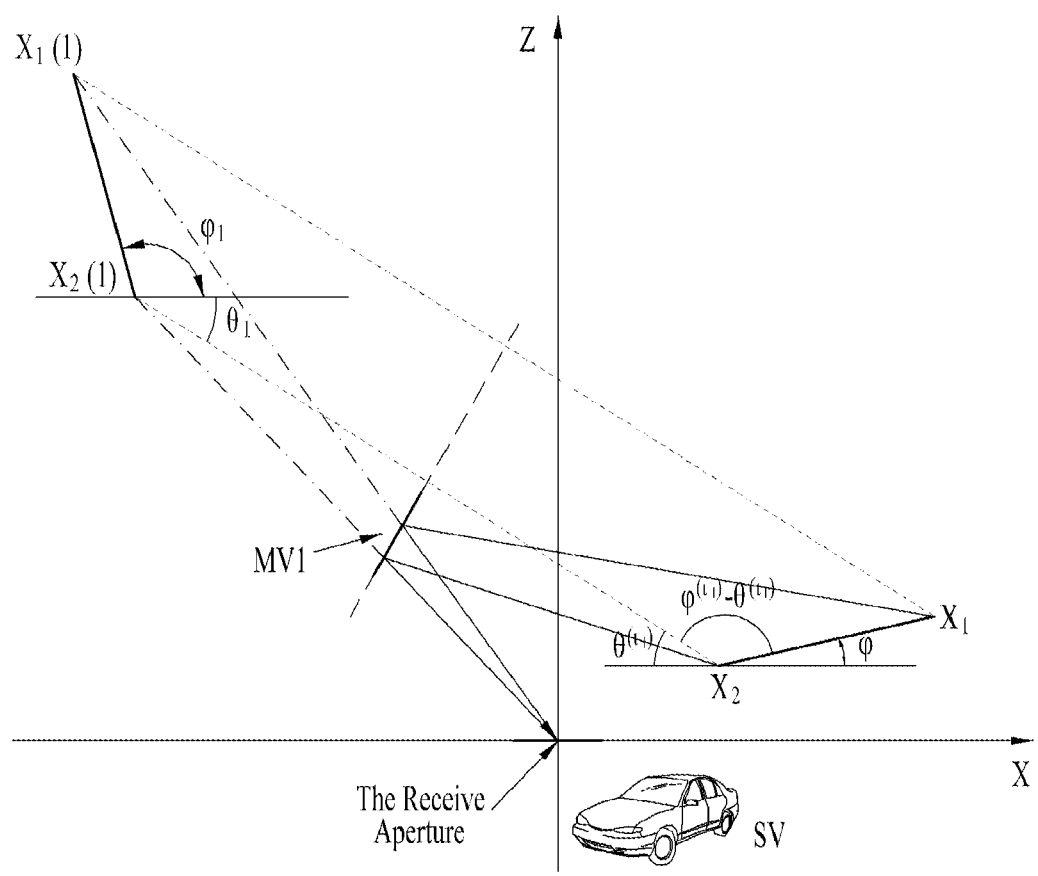
FIG. 12 illustrates the relations between VIs and the TV

2). Let $\phi^{(l)}$ denote the directed angle from the x-axis to the line segment of VI 1 as shown in FIG. 12. The angles $\theta^{(l)}$ and $\phi^{(l)}$ enable to make a relation between two VIs $l_1$ and $l_2$ as $$\theta^{(l_1)} - \theta^{(l_2)} = \frac{\phi^{(l_1)} - \phi^{(l_2)}}{2}.$$ [equation 43]

Proof: See Appendix A.

Some intuitions are made from Lemma 1. First, it is shown in equation 40 that the coordinates of $(x_1, x_2)$ can be calculated when $\theta^{(l_1)}$ and $\theta^{(l_2)}$ are given. Second, noting that $\phi^{(l_1)}$ and $\phi^{(l_2)}$ are observable from VIs $l_1$ and $l_2$ directly, $\theta^{(l_2)}$ is easily calculated when $\theta^{(l_1)}$ is given. Last, $\theta^{(l_1)}$ and the resultant $(x_1, x_2)$ are said to be correct if another combination of two VIs, for example $l_1$ and $l_3$, can yield the equivalent result of $(x_1, x_2)$. As a result, we can lead to the following feasibility condition.

Proposition 1 (Feasibility Condition of Image Reconstruction). To reconstruct the real image of TV, at least three VIs are required: $L \geq 3$.

Proof: See Appendix B.

Suppose L VIs of the same TV are obtained at the SV. First the SV divides the VIs into different couples $\{l_1, l_q\}_{q=2}^L$, which are composed of VI $l_1$ and VI $l_q$. With a given value of $\theta^{(l_1)}$, the SV can calculate $(x_1, x_2)$ with each couple of VIs $\{l_1, l_q\}$ based on equation 42 and equation 43. Thus $(L-1)$ estimates on $(x_1, x_2)$ can be obtained in SV, which is denoted as $\{(\hat{x}_1^{(q)}, \hat{x}_2^{(q)})\}_{q=2}^L$. Then the SV searches the angle $\theta^{(l_1)}$ in $[-\pi, \pi]$ to minimize $$\sum_{p=2}^L \sum_{q=2}^L \left( \|\hat{x}_1^{(q)} - \hat{x}_1^{(p)}\| + \|\hat{x}_2^{(q)} - \hat{x}_2^{(p)}\| \right).$$

After the searching process, optimal resultant $(x^*_1, x^*_2)$ can be obtained by taking average on the $(L-1)$ estimates $\{(\hat{x}_1^{(q)}, \hat{x}_2^{(q)})\}_{q=2}^L$, which are determined by the optimal $\theta^{(l_1)}$.

Moreover, based on the optimal resultant, the line function of the reflection side of the MV $l_1$ can be given by $$l_{l_1}: z = \frac{1}{2}(z_1^{(\ell_1)} + z_1^*) - \frac{1}{2\tan\theta_1}(2x - x_1^{(\ell_1)} - x_1^*). \quad \text{[equation 44]}$$

Therefore, the SV can shift the VI $l_1$ to the symmetric position with respect to $l_{l_1}$. Thus the image of the TV is obtained in SV.

Case 2: NLOS Signal Path

In this section we consider a more complicated scheme where the TV is blocked by some trucks and thus is invisible to the SV. To recover the image of the TV in the SV, synchronization and imaging procedures are also necessary and are similar to the LoS scheme. Moreover, a common-point detection approach is used in this scheme to find the location of the TV because it cannot be directly obtained.

Synchronization

In the synchronization procedure for the NLoS scheme, signals from both representative antennas $n_1$ and $n_2$ are used in the SV. First we consider the signals from the antenna $n_1$, where the SV can distinguish the two waveforms as equation 7. Moreover, the travel distance is given as $$d_{n_1,m}^{(\ell)} = c \cdot \tau_{n_1,m}^{(\ell)} = c \frac{\eta_{n_1,m}^{(\ell)}}{2\pi\Delta} + c\sigma, \quad \text{[equation 39]}$$

where $\eta_{n_1,m}^{(\ell)} = 2\pi\Delta(\tau_{n_1,m}^{(\ell)} - \sigma)$ is the phase difference between the two waveforms. Similar to the synchronization process in the LoS scheme, $\sigma$ can be derived by using at least four phase difference information, and synchronization can be achieved as well.

The only difference between the synchronization parts in two schemes is that $d_{n_1,m}^{(\ell)}$ in equation 39 is the distance from the path. Note that $d_{n_1,m}^{(\ell)}$ equals to the distance from the virtual point $x_1^{(\ell)} = (x_1^{(\ell)}, y_1^{(\ell)}, z_1^{(\ell)})$, which is symmetric to $x_1$ with respect to the l-th MV, to the receive antenna m. Without the knowledge of the MVs, the SV will regard $x_1^{(\ell)}$ as the location of the transmit antenna. Thus $x_1^{(\ell)}$ can be derived together with $\sigma$, and $x_2^{(\ell)}$ can be derived in the same way. Also because of the unawareness of MVs, the SV reconstructs VIs in the following imaging procedures.

Virtual Imaging Reconstruction

The SV can take the same imaging process as the LoS scheme. The shape information can still be obtained from the reconstructed VIs, while the location of the TV cannot be determined directly with one image. In the following, we show that the shape information can be obtained similarly.

Without loss of generality, we take the signals from the path as an example. The 3D surface integral form of $y_m^{\ell,k}$ can be expressed as $$y_m^{\ell,k} = \int_{R^3} I_{x_\ell} \exp\left(-j\frac{2\pi f_k}{c}\sqrt{(x_\ell - p_m)(x_\ell - p_m)^T} + \iota\Gamma^{(\ell)}\right)dx_\ell, \quad \text{[equation 40]}$$

where $\sqrt{(x_{\ell'} - p_m)(x_{x} - p_m)^T}$ represents the Euclidean distance from point $x_{\ell'}$, which is symmetric to x with respect to the l-th MV, to the location of the SV antenna m denoted by $p_m = [x_m, y_m, z_0]$. Then decompose the spherical wave into an infinite superposition of plane waves, the exponential term in equation 40 can be rewritten as $$y_m^{\ell,k} = \exp(j\iota\Gamma^{(\ell)})\int_{R^3} I_{x_\ell}\left\{\int_{\sqrt{f_k f_k^T} = f_k} \exp\left(-j\frac{2\pi}{c}f_k(x_\ell - p_m)^T\right)df_k\right\}dx_\ell \quad \text{[equation 41]}$$

From the comparison of equation 41 and equation 31, it is easy to infer that $\exp(j<\Gamma^{(\ell)})\{I_{x_\ell}\}$ can be obtained by taking the same procedures as the LoS scheme. Although this results are affected by the phase change due to reflection, the shape information is still remained because $\exp(-j<\Gamma^{(\ell)})$ only affects the angle of the received signals. Thus in the NLoS scheme, the SV is still able to recover the VIs of the TV with the imaging algorithm introduced in the LoS scheme. However, the accurate location information of the TV cannot be obtained from only one VI. Therefore, we introduce a common-point detection approach assisted by multiple VIs to locate the TV in the next subsection.

Reconstructing Real Image from Multiple Virtual Images

In this subsection, we aim at reconstructing the TV's real image from multiple VIs. To this end, we utilize the fact that the two representative points in VI whose coordinates are $x_1^{(\ell)} = (x_1^{(\ell)}, y_1^{(\ell)}, z_1^{(\ell)})$ and $x_2^{(\ell)} = (x_2^{(\ell)}, y_2^{(\ell)}, z_2^{(\ell)})$ have some geographical relations with the counterpart points on the real image denoted by $x_1 = (x_1, y_1, z_1)$ and $x_2 = (x_2, y_2, z_2)$ which are summarized in Lemma 1. Using the properties, the feasible condition of real image reconstruction is derived and the corresponding algorithm is designed based on the feasible condition.

Lemma 1. Consider VIs $l_1$ and $l_2$ whose representative points are $\{x_i^{(l_1)}\}_{i=1}^2$ and $\{x_i^{(l_2)}\}_{i=1}^2$ respectively, which have relations with the counterpart points of the real image denoted by ($x_1$, $x_2$) as follows.

Remark 5 (Existence of LoS paths). The SV may not be able to distinguish the signals from LoS under some conditions. Note that the LoS case is a special realization of (NLoS case, where one couple of representative points $(x_1^{(0)}, x_2^{(0)})$ coincide with the correct resultant $(x_1, x_2)$. Therefore, all mathematical expression in the common-point detection approach still holds in the LoS condition, and the resultant $(x^*_1, x^*_2)$ can be obtained in the same way. Moreover, a threshold $\delta$ with appropriate value is set in the SV to detect the LoS condition. Once $\|x^*_1 - x_1^{(l_q)}\| + \|x^*_2 - x_2^{(l_q)}\| < \delta$, the SV will detect it as the LoS condition and treat VI $l_q$ as the image of the TV.

Simulation Result

In simulation, some figures are given to show the performance of the imaging algorithm, which also helps the illustration of the whole procedure. Signature waveforms at 6 frequencies are used for the synchronization procedure. The frequencies used in the imaging processing are from 27 GHz to 30 GHz in the $K_a$ band with $\Delta_f = 46.87$ MHz and K=64. The number of transmit antennas in the TV is 300 and the number of receive antenna in the receive aperture is 16×16=256. The receive aperture size is 1 m×1 m.

Firstly, we introduce the metric used to measure the performance of images. We use the Hausdorff distance as the performance metric to evaluate the performance of images obtained with appropriate detection thresholds. Hausdorff distance is widely used in the image registration, which is given as

[equation 45]

$$H(A,B)=\max(h(A,B),h(B,A)),$$

where $$h(A, B) = \max_{a \in A} \min_{b \in B} \|a - b\|$$

is the direct Hausdorff distance from B to A. The Hausdorff distance measures the similarity between two images. We show that the Hausdorff distance between the VIs and the TV model set in advance is quite small, which means these two images are replaceable by each other. Thus the SV can capture the shape of the TV from the VIs.

(a) Point model of TV, reflection surface and the receive aperture.
(b) Envelop Diagram of TV.

Figure 13:
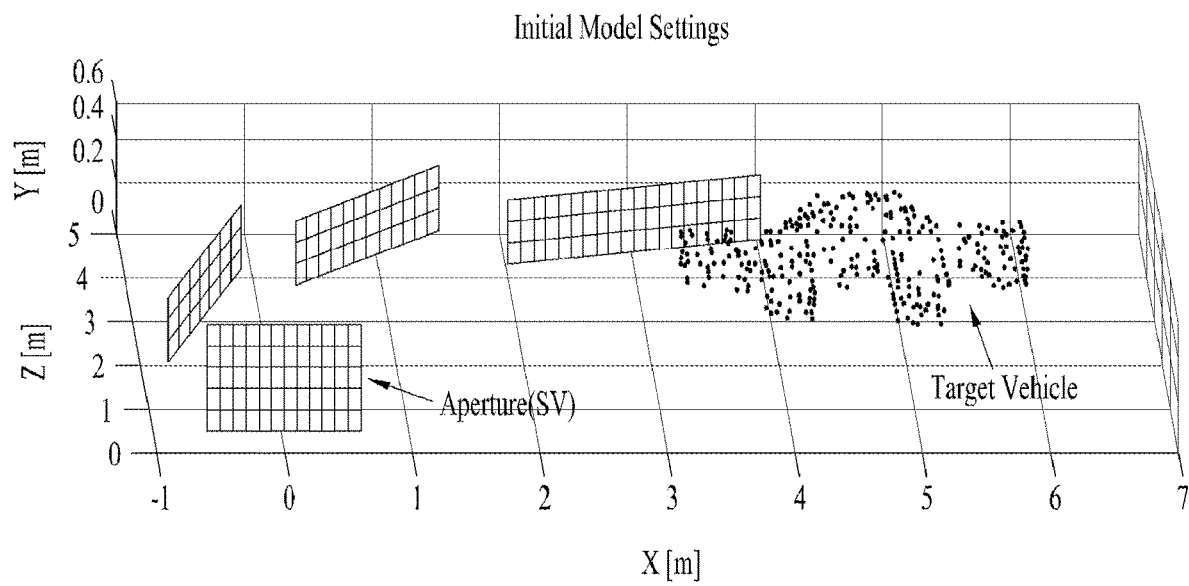
FIG. 13 illustrates the Initial settings of the scenario.
Figure 13:
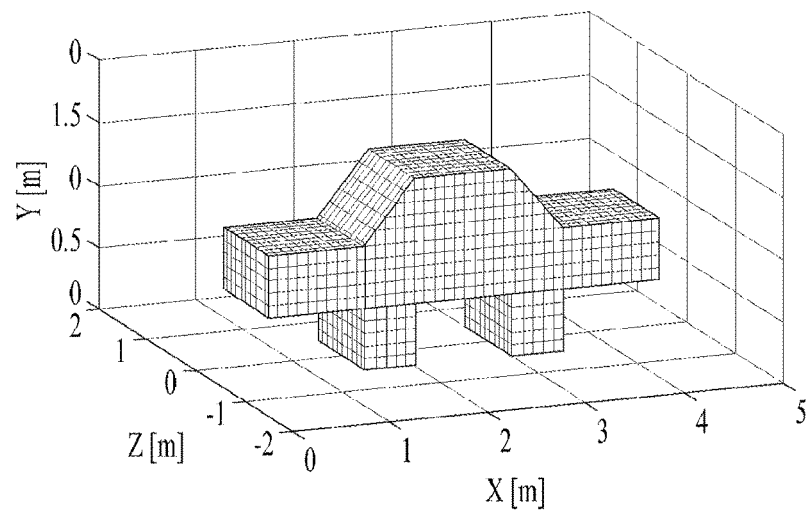

FIG. 13 is the initial setting of the scenario. The x direction is the moving direction of the SV. The y and z directions represent the height and the depth, respectively. Here a discrete-point model of a car is used to represent the TV, as shown in FIG. 13(a). Moreover, three sides of MVs are set with plane

[equation 46]

$$S_1: z = 1.02x+3,$$

$$S_2: z = \frac{x + 13}{4},$$

$$S_3: z = 3x+4,$$

and the aperture in the SV is also ploted. The receive aperture is parallel to the y axis and centered at (0,0,0). The envelop diagram is also given in FIG. 13(b). The performance of the images obtained with our algorithm can be evaluated by the comparison of the VIs and the TV.

Figure 14:
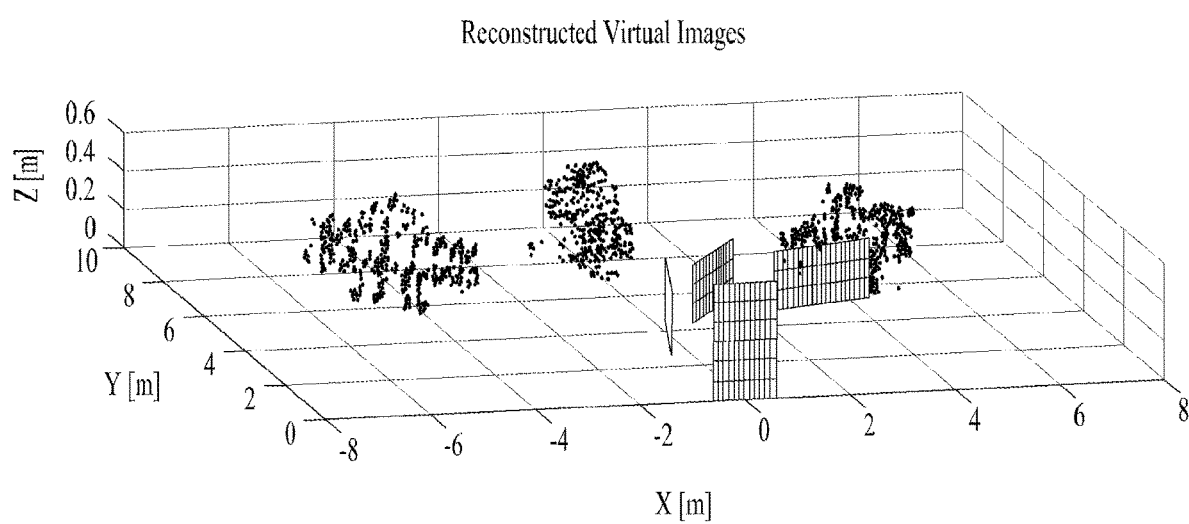
FIG. 14 illustrates imaging reconstruction of the Vis

Without loss of generality, signals received from the direction of the 1-st VI is selected. Therefore, the SV can receive the signals reflected by the 1-st MV and distinguish the signature waveforms from the common points in the 1-st VI. Then the synchronization procedures are taken and the location of the common points can be figured out. After synchronization, the SV can reconstruct the 1-st VI based on the received signals. The performance of the VIs is shown in FIG. 14. The reflection surface and the receive aperture in SV are also plotted.

When other AoAs are selected, other VIs can also be reconstructed in the same way. Note that the synchronization procedure needs to be done every time before imaging because synchronization procedure can also help recognize if the signals are from the same TV, which indicates whether the images belong to the same vehicle.

Figure 15:
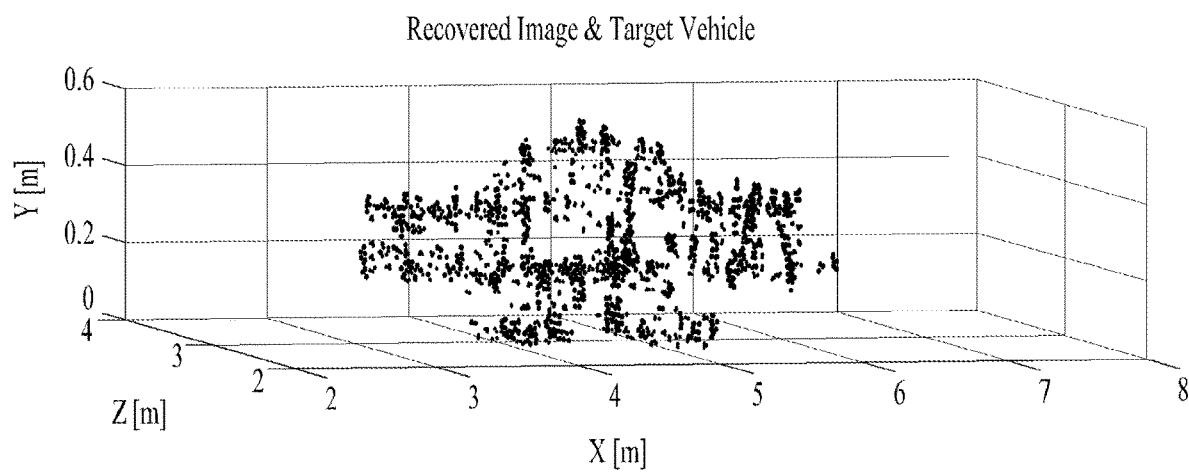
FIG. 15 illustrates initial settings of the scenario
Figure 15:
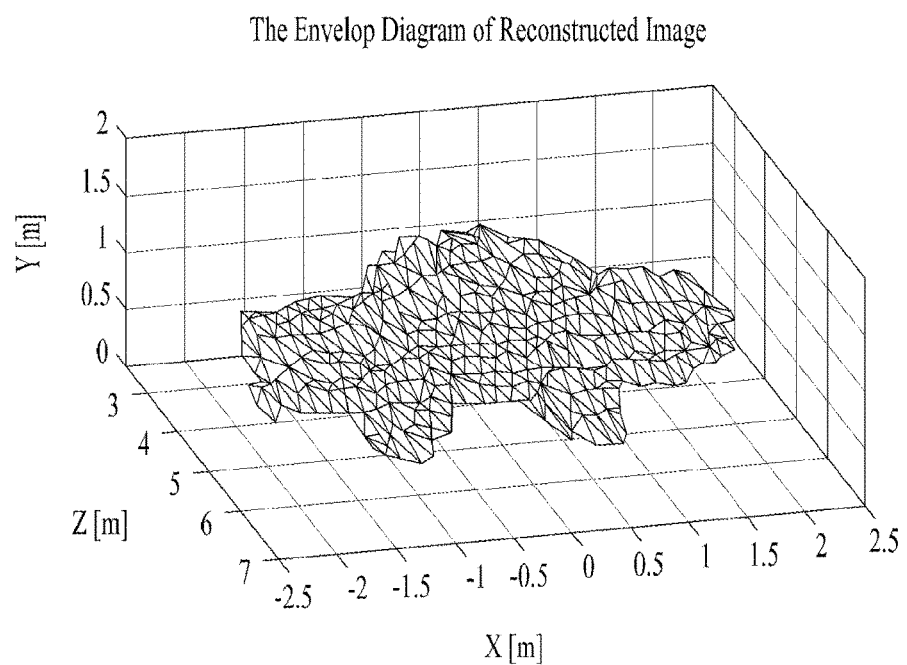

After the AoA selection, synchronization and imaging processing procedures, the SV collects the location information of all the common points $\{x_1^{(l)}, x_2^{(l)}\}_{l=1}^L$ from different VIs and use the common-point detection approach to locate the TV. Then the relation between the TV and all the VIs can be figured out. Here we select the 1-st reconstructed VI and shift it to the estimated location of the TV. The Hausdorff distance between the reconstructed image and the ideal TV model is H(A,B)=0.1262 m, which is relatively small compared to the size of the TV model. The performance is shown in FIG. 15(a). Moreover, the envelop diagram of the reconstructed image is also shown in FIG. 15(b), where the general shape information of the TV can be observed.

(a) Reconstructed TV image and the initial TV model.
(b) Envelop Diagram of the reconstructed TV image.

APPENDIX A: PROOF OF LEMMA 1

Figure 16:
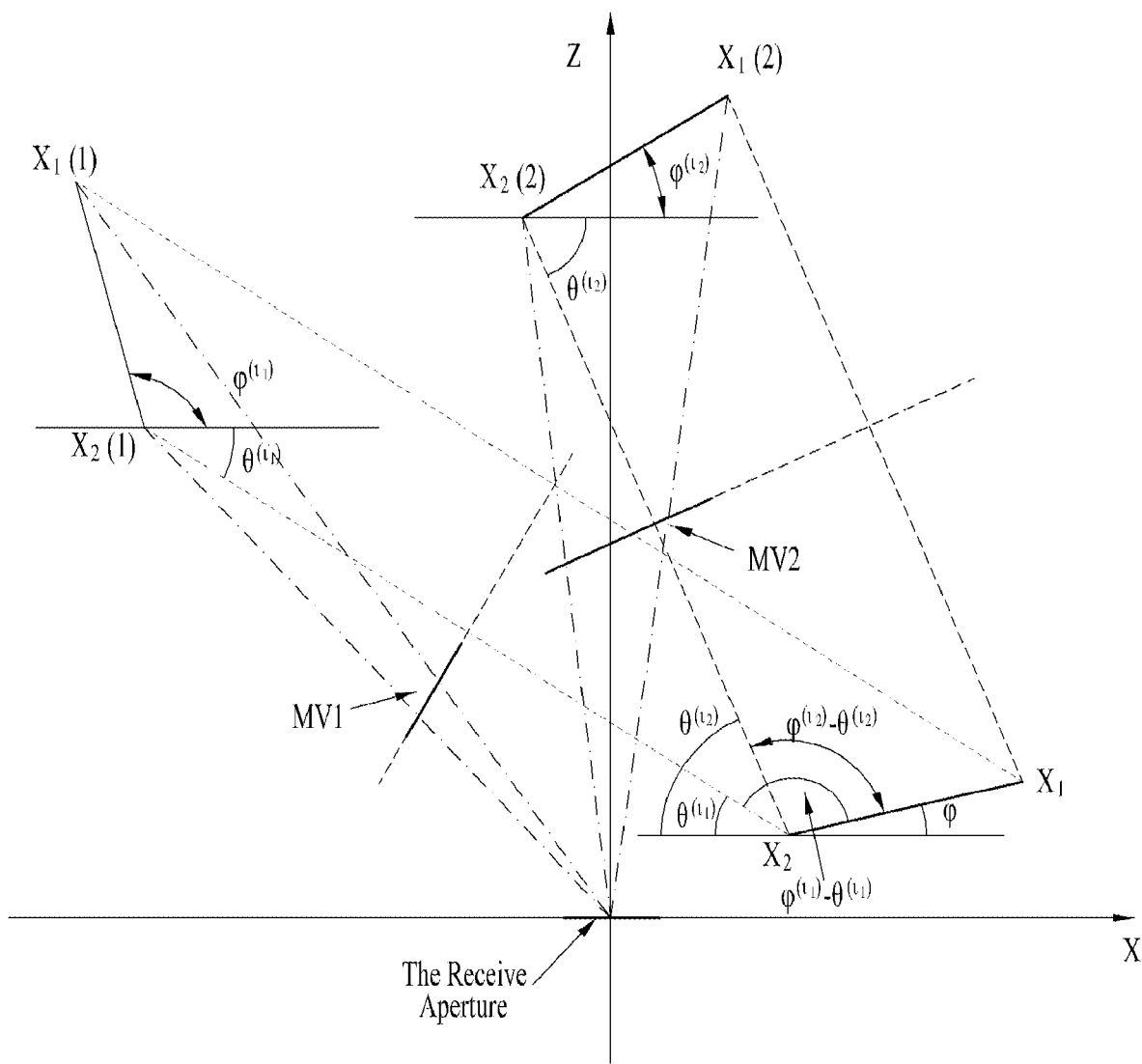
FIG. 16 illustrates the geometry relations among different VIs and the TV.

In FIG. 16, we have $\theta^{(l_1)} \in [-\pi, \pi]$ and the equations of line $l_{x_1^{(l_1)}}$ $$l_{x_1^{(\ell_1)}}$$

and $$l_{x_1^{(\ell_2)}}$$

are $$l_{x_1^{(\ell_1)}} : z = z_1^{(\ell_1)} + \tan\theta^{(\ell_1)}(x - x_1^{(\ell_1)}),$$

$$l_{x_1^{(\ell_2)}} : z = z_1^{(\ell_2)} + \tan\theta^{(\ell_2)}(x - x_1^{(\ell_2)}).$$

Thus we have $$x_1 = \frac{(z_1^{(\ell_1)} - z_1^{(\ell_2)}) + (x_1^{(\ell_2)}\tan\theta^{(\ell_2)} - x_1^{(\ell_1)}\tan\theta^{(\ell_1)})}{\tan\theta^{(\ell_2)} - \tan\theta^{(\ell_1)}},$$  [equation 47]

And

[equation 48]

$$z_1 = z_1^{(l_1)} + \tan\theta^{(l_1)}(x_1 - x_1^{(l_1)}).$$

The general relations in equation 42 can be derived similarly.

Due to the symmetric relation between the VIs and the TV, we have

[equation 49]

$$\pi - \varphi = \varphi^{(l_1)} - 2\theta^{(l_1)} = \varphi^{(l_2)} - 2\theta^{(l_2)},$$

which can be observed from FIG. 16. Thus equation 43 is obtained.

APPENDIX B: PROOF OF PROPOSITION 1

Bring equation 49 into equation 47, $x_1$ can be simplified as $$x_1 = \frac{(z_1^{(\ell_1)} - z_1^{(\ell_2)}) + x_1^{(\ell_2)}\tan\left(\theta^{(\ell_1)} - \frac{\varphi^{(\ell_1)} - \varphi^{(\ell_2)}}{2}\right) - x_1^{(\ell_1)}\tan\theta^{(\ell_1)}}{\tan\left(\theta^{(\ell_1)} - \frac{\varphi^{(\ell_1)} - \varphi^{(\ell_2)}}{2}\right) - \tan\theta^{(\ell_1)}},$$  [equation 50]

which indicates that $x_1$ is only determined by the angle $\theta^{(l_1)} \in [-\pi, \pi]$. Given the angle $\theta^{(l_1)}$, the estimation of $x_1$ from equation 50 is denoted as $\hat{x}_1$.

Similarly, another estimation of $x_1$ can be obtained from the common points $(x_1^{(l_1)}, x_2^{(l_1)})$ and $(x_1^{(l_3)}, x_2^{(l_3)})$, which is given as $$x_1 = \frac{\left((z_1^{(l_1)} - z_1^{(l_3)}) + x_1^{(l_3)}\tan\left(\theta^{(l_1)} - \frac{\varphi^{(l_1)} - \varphi^{(l_3)}}{2}\right) - x_1^{(l_1)}\tan\theta^{(l_1)}\right)}{\left(\tan\left(\theta^{(l_1)} - \frac{\varphi^{(l_1)} - \varphi^{(l_3)}}{2}\right) - \tan\theta^{(l_1)}\right)}. \quad \text{[equation 51]}$$

The estimation of $x_1$ from equation 51 is denoted as $\tilde{x}_1$, and it can be observed from equation 51 that $\tilde{x}_1$ is also only determined by $\theta^{(l_1)}$. Therefore, the SV can search $\theta^{(l_1)}$ in the range of $[-\pi, \pi]$ to minimize $|\hat{x}_1 - \tilde{x}_1|$. Two solutions can be obtained with the optimal $\theta^{(l_1)}$, which is denoted as $\hat{x}^*_1$ and $\tilde{x}^*_1$. Then the optimal solution of $x_1$ can be obtained as $$x_1^* = \frac{\hat{x}_1^* + \tilde{x}_1^*}{2}.$$

With $x^*_1$, $y_1$ and $z_1$ can be calculated according to equation 42. Thus the location of $x_1$ is obtained. The location of the point $x_1$ can be derived in the same way. Therefore, three VIs is enough for the SV to reconstruct the real image of TV. This finishes the proof.

The above embodiment can be summarized as follows

What signal/message should be transmitted?

The stepped-frequency-continuous-wave (SFCW) [9] at millimeter-wave range has been widely used in radar systems to detect target at different distances. It is composed of continuous wave (CW) signals with multiple frequencies, each of which are separated by a certain amount. In our work, all transmit antennas at the TV simultaneously broadcast the same SFCW waveform denoted by s(t), which is given as $$s(t)=[\exp(j2\pi f_1(t)), \ldots, \exp(j2\pi f_K(t))]^T, \quad (2)$$

where $\{f_k\}_{k=1}^K$ represents the set of frequencies with constant gap $\Delta_f$ such that $f_k = f_1 + \alpha_f(k-1)$ for $k=1, \ldots, K$.

Moreover, two representative antenna $n_1$ and $n_2$ are selected from the antenna array in the TV whose coordinates are denoted as $x_1^{(l)}=(x_1^{(l)}, y_1^{(l)}, z_1^{(l)})$ and $x_2^{(l)}=(x_2^{(l)}, y_2^{(l)}, z_2^{(l)})$, respectively. Using the selected antennas, TV simultaneously transmits signature waveforms with different frequencies $\{f_{K+1}, f_{K+2}\} \notin \{f_k\}_{k=1}^K$ at $n_1$ and $\{f_{K+3}, f_{K+4}\} \notin \{f_k\}_{k=1}^K$ at $n_2$ [11].

2). In 1), is there any specific condition or assumption?
 a. The transmitted signals are continuous wave, and should be in the millimeter-wave range to ensure the reflection property on the metal surface or tinted glass.
 b. The signals for imaging and the signals for synchronization are transmitted together.
 c. After the synchronization procedure, the estimated synchronization gap $\hat{\sigma}$ may not be the real synchronization gap $\sigma$ due to the phase ambiguity. Therefore, only signals at some specific frequencies can achieve the synchronization, which set a constraint on the frequency gap $\Delta = f_{K+2} - f_{K+1}$ that the frequency step $\Delta_f$ of the signals for the imaging needs to be integer times of $\Delta$.
 d. We assume that the signals reflected by different MVs come from different directions, which meets the conditions in practice.
 e. We assume that the signals experience 'mirror' reflection on the surface of the vehicles nearby. This is because the signals at millimeter-wave range are quite directional and has good optical properties. And its wavelength is short compared with signals in lower frequencies, such as WiFi signals, which brings this technique good resolution [14]. Moreover, compared with some new techniques such as LiDAR, millimeter-wave shows better reflection property on the metal surface [16], [17] and thus can help handle the NLoS condition. The reflection coefficient of millimeter-wave on the metal surface is approximately 1 in power and the phase shift is approximately constant if the incident angle is not too close to 0° or 90°. Therefore, considering that the vehicle surface is flat in most cases, millimeter-wave will have good performance to capture the shape information of the TV in both the LoS and NLoS conditions.

3). What receiver behavior should be performed when the signal in 1) is received?
 A. Receiver internal operation
 B. What response message should be transmitted?
  i. To which node?
  ii. Message contents or signal format?
 A. In the first step, the receiver demodulate the received signals with asynchronous signals at different frequencies. Therefore, signals at different frequencies can be differentiated easily.

Secondly, the demodulated signals at frequencies $\{f_k\}_{k=1}^K$ will be stored to wait for the synchronization. And the receiver also take the signals at frequency $f_{K+1}$ and $f_{K+2}$ through the phase detector. The detected phases will be used in the synchronization part, and an estimation $\hat{\sigma}$ on the synchronization gap $\sigma$ will be obtained. Synchronization can be achieved by compensating the synchronization gap in equation 6 with $\hat{\sigma}$. After the signals achieved synchronization, the receiver can apply the imaging algorithm with these signals directly.

If it is in a NLoS condition (the general condition), then the SV also needs to locate the TV with the location information obtained in the synchronization step. And the recovered image will be shifted to the correct location in the end.

The transmission process is illustrated in detail in the system model section. And the synchronization, imaging, and location detection procedures are given in the following sections.

B. The SV does not send any feedback to the TV. To capture the shape information of the TV, the SV only need to receive the waveforms from the TV. Meanwhile, considering the high mobility of the vehicles, it may not easy to establish stable link between the TV and the SV, while utilizing some waveforms to do the sensing should be more practical.

4) From above procedures, what benefit can be achieved?

Firstly, the synchronization problem can be solved by using signature waveforms at two frequencies in LoS condition or four frequencies in NLoS condition (LoS condition can be included in the NLoS condition). The synchronization algorithm is easy to apply and works efficiently.

Secondly, we apply the imaging algorithm to capture the shape information. The imaging algorithm is evolved from some imaging techniques applied in the radar systems [4]-[7] where the transmitters and the receivers are at the same terminal. All these radar systems need long time scanning and can hardly to achieve real time results. However, in our work, the shape information contains in the location of the transmit antennas, and the reflection is on the surface of the MVs, which is flat in most cases. Therefore, the TV can transmit all the signals simultaneously can the SV can recover its shape information quickly, as well as the location information.

Device Configuration According to Embodiments of the Present Invention

Figure 17:
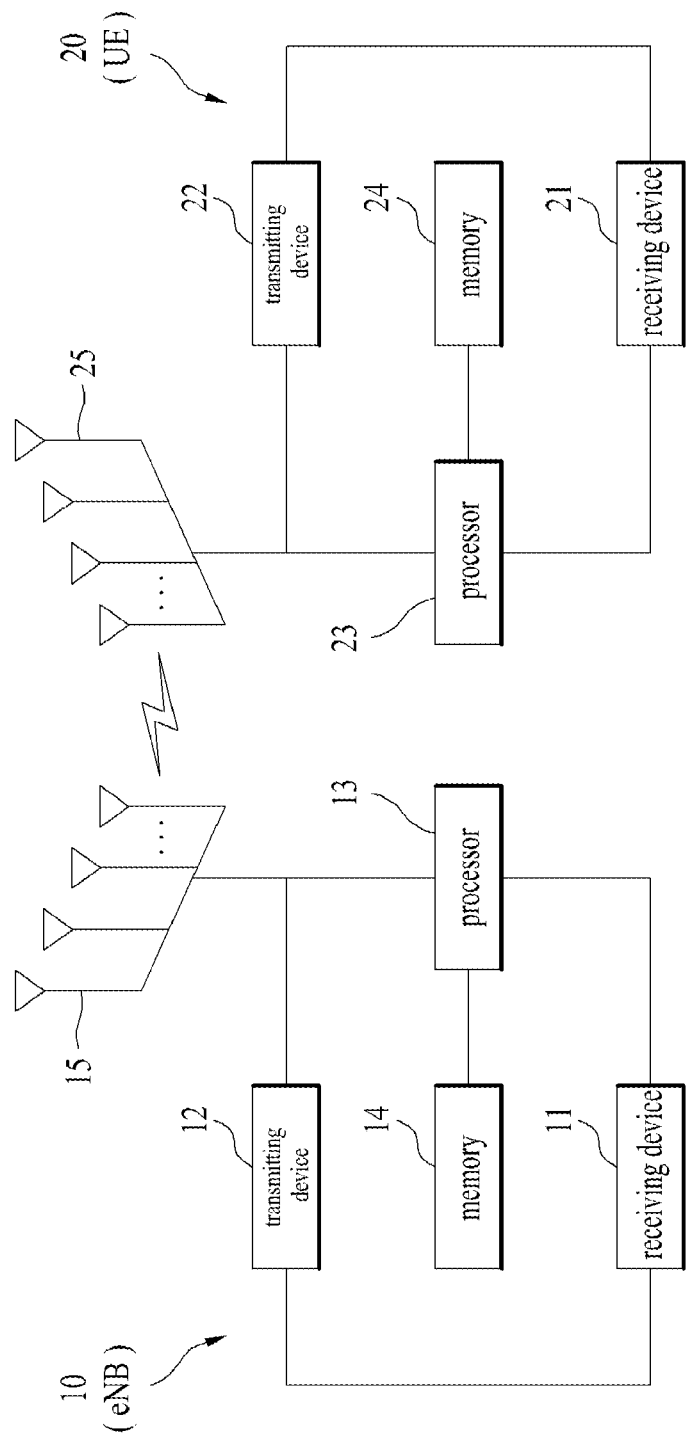
FIG. 17 is a diagram showing a configuration of a transmission device and a reception device.

FIG. 17 is a diagram showing a configuration of a transmission point apparatus and a UE according to an embodiment of the present invention.

Referring to FIG. 17, a transmission point apparatus 10 may include a receiver 11, a transmitter 12, a processor 13, a memory 14, and a plurality of antennas 15. The plurality of antennas 15 represents the transmission point apparatus supporting MIMO transmission/reception. The receiver 11 may receive various kinds of signals, data and information on the uplink from the UE. The transmitter 12 may transmit various kinds of signals, data and information on the downlink to the UE. The processor 13 may control overall operation of the transmission point apparatus 10. The processor 13 of the transmission point apparatus 10 according to one embodiment may process necessary details in each of the above-described embodiments.

The processor 13 of the transmission point apparatus 10 may also perform a function of computationally processing information received by the transmission point apparatus 10 and information to be transmitted to the outside, and the memory 14 may store the computationally processed information and the like for a predetermined time, and may be replaced by a component such as a buffer (not shown).

Next, referring to FIG. 17, a UE 20 may include a receiver 21, a transmitter 22, a processor 23, a memory 24, and a plurality of antennas 25 have. The plurality of antennas 25 represents the UE supporting MIMO transmission/reception. The receiver 21 may receive various kinds of signals, data and information on the downlink from a base station. The transmitter 22 may transmit various kinds of signals, data and information on the uplink to the base station. The processor 23 may control overall operation of the UE 20.

The processor 23 of the UE 20 according to one embodiment may process necessary details in each of the above-described embodiments. Specifically, the processor may receive error information related to the location of a second UE, determine one or more of a beam direction, a range for performing beam search, and an order in which the beam search is to be performed using the error information about the second UE, perform beam search according to the determination, and transmit a signal to the second UE through beamforming according to a result of the beam search. The processor 23 of the UE 20 may also perform a function of computationally processing information received by the UE 20 and information to be transmitted to the outside, and the memory 24 may store the computationally processed information and the like for a predetermined time and may be replaced by a component such as a buffer (not shown).

The specific configuration of the transmission point apparatus and the UE may be implemented such that the details described in the various embodiments of the present invention may be applied independently or implemented such that two or more of the embodiments are applied at the same time. For clarity, redundant description is omitted.

In the example of FIG. 17, the description of the transmission point apparatus 10 may also be applied to a relay device as a downlink transmission entity or an uplink reception entity, and the description of the UE 20 may also be applied to a relay device as a downlink reception entity or an uplink transmission entity.

The embodiments of the present disclosure may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is apparent to those skilled in the art that claims that are not explicitly cited in each other in the appended claims may be presented in combination as an embodiment of the present disclosure or included as a new claim by a subsequent amendment after the application is filed.

REFERENCES

[1] Y. Maalej, S. Sorour, A. Abdel-Rahim, and M. Guizani, "Vanets meet autonomous vehicles: Multimodal surrounding recognition using manifold alignment," IEEE Access, vol. 6, pp. 29026-29040, 2018.

[2] G. L. Foresti and C. S. Regazzoni, "Multisensor data fusion for autonomous vehicle navigation in risky environments," IEEE Transactions on Vehicular Technology, vol. 51, pp. 1165-1185, September 2002.

[3] M. A. Abidi and R. C. Gonzalez, "The use of multisensor data for robotic applications," IEEE Transactions on Robotics and Automation, vol. 6, pp. 159-177, April 1990.

[4] R. K. Raney, H. Runge, R. Bamler, I. G. Cumming, and F. H. Wong, "Precision sar processing using chirp scaling," IEEE Transactions on Geoscience and Remote Sensing, vol. 32, pp. 786-799, July 1994.
[5] J. M. Munoz-Ferreras, J. Calvo-Gallego, F. Perez-Martinez, A. B. del Campo, A. Asensio-Lopez, and B. P. Dorta-Naranjo, "Motion compensation for isar based on the shift-and-convolution algorithm," in 2006 IEEE Conference on Radar, pp. 5 pp.-, April 2006.
[6] Q. Cheng, A. Alomainy, and Y. Hao, "Near-field millimeter-wave phased array imaging with compressive sensing," IEEE Access, vol. 5, pp. 18975-18986, 2017.
[7] Y. lvarez, Y. Rodriguez-Vaqueiro, B. Gonzalez-Valdes, C. M. Rappaport, F. Las-Heras, and J. Martinez-Lorenzo, "Three-dimensional compressed sensing-based millimeter-wave imaging," IEEE Transactions on Antennas and Propagation, vol. 63, pp. 5868-5873, December 2015.
[8] A. Moreira, P. Prats-Iraola, M. Younis, G. Krieger, I. Hajnsek, and K. P. Papathanassiou, "A tutorial on synthetic aperture radar," IEEE Geoscience and Remote Sensing Magazine, vol. 1, pp. 6-43, March 2013.
[9] C. Nguyen and J. Park, Stepped-Frequency Radar Sensors: Theory, Analysis and Design. Springer International Publishing, 2016.
[10] S. R. Saunders and S. R. Simon, Antennas and Propagation for Wireless Communication Systems. New York, NY, USA: John Wiley & Sons, Inc., 1st ed., 1999.
[11] D. Cohen, D. Cohen, Y. C. Eldar, and A. M. Haimovich, "Sub-Nyquist pulse doppler MIMO radar," in 2017 IEEE International Conference on Acoustics, Speech and Signal Processing (ICASSP), pp. 3201-3205, March 2017.
[12] P. V. Nikitin, R. Martinez, S. Ramamurthy, H. Leland, G. Spiess, and K. V. S. Rao, "Phase based spatial identification of UHF RFID tags," in 2010 IEEE International Conference on RFID (IEEE RFID 2010), pp. 102-109, April 2010.
[13] K. Fujii, Y. Sakamoto, W. Wang, H. Arie, A. Schmitz, and S. Sugano, "Hyperbolic positioning with antenna arrays and multi-channel pseudolite for indoor localization," Sensors, vol. 15, no. 10, pp. 25157-25175, 2015.
[14] D. M. Sheen, D. L. McMakin, and T. E. Hall, "Three-dimensional millimeter-wave imaging for concealed weapon detection," IEEE Transactions on Microwave Theory and Techniques, vol. 49, pp. 1581-1592, September 2001.
[15] D. P. Huttenlocher, G. A. Klanderman, and W. J. Rucklidge, "Comparing images using the Hausdorff distance," IEEE Transactions on Pattern Analysis and Machine Intelligence, vol. 15, pp. 850-863, September 1993.
[16] H. Zhao, R. Mayzus, S. Sun, M. Samimi, J. K. Schulz, Y. Azar, K. Wang, G. N. Wong, F. Gutierrez, and T. S. Rappaport, "28 GHz millimeter wave cellular communication measurements for reflection and penetration loss in and around buildings in new york city," in 2013 IEEE International Conference on Communications (ICC), pp. 5163-5167, June 2013.
[17] I. Cuinas, D. Martinez, M. G. Sanchez, and A. V. Alejos, "Modelling and measuring reflection due to flat dielectric at 5.8 GHz," IEEE Transactions on Antennas and Propagation, vol. 55, pp. 1139-1147, April 2007.

INDUSTRIAL APPLICABILITY

The above-described embodiments of the present disclosure are applicable to various mobile communication systems.

The invention claimed is:
1. A method for performing a vehicle image reconstruction by a sensing vehicle (SV) in a wireless communication system, the method comprising:
receiving a plurality of stepped-frequency-continuous-wave signals (SFCWs) from a target vehicle (TV);
receiving signature waveforms in a different frequency range for the plurality of SFCWs;
performing synchronization by using phase-difference-of-arrival (PDoA) based on the signature waveforms;
reconstructing one or more virtual images of the TV;
deriving a real image from the one of more virtual images.
2. The method according to claim 1, wherein the signature waveforms consist of two pairs of signature waveforms, with each pair of signature waveforms containing two signature waveforms.
3. The method according to claim 2, wherein the each pair of signature waveforms are the transmitted from two specific transmit antennas at the TV.
4. The method according to claim 2, wherein the signature waveforms of each pair are received at different frequencies outside the bandwidth of the SFCWs.
5. The method according to claim 2, wherein the synchronization is performed by deriving a synchronization gap between the TV and the SV.
6. The method according to claim 2, wherein the synchronization gap is derived based on a phase difference between the two pairs of signature waveforms.
7. The method according to claim 1, wherein the one or more Virtual images are reconstructed by using a three-dimensional (3D) Fourier transform.
8. The method according to claim 1, wherein a deriving the real image is performed using that the real image is on a symmetric position of the one or more virtual images on the basis of a reflection side of a mirror vehicle.
9. The method according to claim 8, wherein two common point of virtual image 1 are $x_1^{(l)}=(x_1^{(l)}, y_1^{(l)}, z_1^{(l)})$ and $x_2^{(l)}=(x_2^{(l)}, y_2^{(l)}, z_2^{(l)})$.
10. The method according to claim 9, wherein the two common point corresponds to two specific transmit antennas of the TV.
11. The method according to claim 9, wherein two common points of the real image are $x_1=(x_1, y_1, z_1)$ and $x_2=(x_2, y_2, z_2)$.
12. The method according to claim 11, wherein a relation between the coordinates of $(x_1, x_2)$ is represented as

$$x_i = \begin{pmatrix} x_i \\ y_i \\ z_i \end{pmatrix} = \begin{pmatrix} \frac{(z_i^{(\ell_1)} - z_i^{(\ell_2)}) + (x_i^{(\ell_2)}\tan(\theta^{(\ell_2)}) - x_i^{(\ell_1)}\tan(\theta^{(\ell_1)}))}{\theta^{(\ell_2)} - \theta^{(\ell_1)}} \\ y_i^{(\ell_1)} \text{ or } y_i^{(\ell_2)} \\ z_i^{(\ell_1)} + \tan\theta^{(\ell_1)}(x_i - x_i^{(\ell_1)}) \end{pmatrix},$$

$$i = 1, 2,$$

wherein $\theta^{(l)}$ denote the directed angle from the x-axis to the virtual line between ($x_1^{(l)}$ and $x_1$) or ($x_2^{(l)}$ and $x_2$).
13. The method according to claim 12, the x-axis corresponds to the SV's moving direction.

14. A sensing vehicle (SV) performing a vehicle image reconstruction in a wireless communication system, the first terminal comprising:
- a transmitting device and a receiving device; and
- a processor,
- wherein the processor is configured to:
  - receive a plurality of stepped-frequency-continuous-wave signals (SFCWs) from target vehicle (TV);
  - receive signature waveforms in a different frequency range for the plurality of SFCWs;
  - perform synchronization by using phase-difference-of-arrival (PDoA) based on the signature waveforms;
  - reconstruct one or more virtual images of the TV; and
  - derive a real image from the one of more virtual images.

* * * * *